(12) United States Patent
Kim et al.

(10) Patent No.: US 12,457,338 B2
(45) Date of Patent: *Oct. 28, 2025

(54) METHOD AND DEVICE FOR ENCODING/DECODING IMAGES

(71) Applicants: Electronics and Telecommunications Research Institute, Daejeon (KR); UNIVERSITY-INDUSTRY COOPERATION GROUP OF KYUNG HEE UNIVERSITY, Yongin-si (KR)

(72) Inventors: Hui Yong Kim, Daejeon (KR); Sung Chang Lim, Daejeon (KR); Jin Ho Lee, Daejeon (KR); Jin Soo Choi, Daejeon (KR); Jin Woong Kim, Daejeon (KR); Gwang Hoon Park, Seongnam-si (KR); Kyung Yong Kim, Suwon-si (KR)

(73) Assignees: Electronics and Telecommunications Research Institute, Daejeon (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,645

(22) Filed: May 2, 2024

(65) Prior Publication Data
US 2024/0283934 A1 Aug. 22, 2024

Related U.S. Application Data

(63) Continuation of application No. 18/160,976, filed on Jan. 27, 2023, now Pat. No. 12,010,312, which is a
(Continued)

(30) Foreign Application Priority Data

Jun. 29, 2012 (KR) .................. 10-2012-0071446
Jun. 25, 2013 (KR) .................. 10-2013-0073067

(51) Int. Cl.
*H04N 19/129* (2014.01)
*H04N 19/119* (2014.01)
(Continued)

(52) U.S. Cl.
CPC ......... *H04N 19/129* (2014.11); *H04N 19/119* (2014.11); *H04N 19/122* (2014.11);
(Continued)

(58) Field of Classification Search
CPC .. H04N 19/129; H04N 19/119; H04N 19/122; H04N 19/124; H04N 19/136;
(Continued)

(56) References Cited

U.S. PATENT DOCUMENTS 8,483,285 B2 7/2013 Ye et al.
8,792,738 B2 7/2014 Ikai
(Continued)

FOREIGN PATENT DOCUMENTS

CA 2 857 849 A1 10/2011
CN 102265618 A 11/2011
(Continued)

OTHER PUBLICATIONS

Saxena, Ankur et al., "CE7: Mode-dependent DCT/DST for intra prediction in video coding", *Joint Collaborative Team on Video Coding (JCT-VC) of ITU-T SG16 WP3 and ISO/IEC JTC1/SC29/WG11*, 4th Meeting: Daegu, Republic of Korea, Jan. 20-28, 2011 (pp. 1-8).
(Continued)

*Primary Examiner* — Jose L Couso
(74) *Attorney, Agent, or Firm* — BROADVIEW IP LAW, PC

(57) ABSTRACT

A method and a device for encoding/decoding images are disclosed. The method for encoding images comprises the steps of: deriving a scan type of a residual signal for a current block according to whether or not the current block is a transform skip block; and applying the scan type to the residual signal for the current block, wherein the transform skip block is a block to which transform for the current block is not applied and is specified on the basis of information
(Continued)

indicating whether or not transform for the current block is to be applied.

10 Claims, 18 Drawing Sheets

Related U.S. Application Data continuation of application No. 17/130,042, filed on Dec. 22, 2020, now Pat. No. 11,595,655, which is a continuation of application No. 16/999,252, filed on Aug. 21, 2020, now Pat. No. 11,399,186, which is a continuation of application No. 16/413,870, filed on May 16, 2019, now Pat. No. 10,827,177, which is a continuation of application No. 15/630,831, filed on Jun. 22, 2017, now Pat. No. 10,341,661, which is a continuation of application No. 15/255,035, filed on Sep. 1, 2016, now Pat. No. 9,723,311, which is a continuation of application No. 14/406,438, filed as application No. PCT/KR2013/005616 on Jun. 25, 2013, now Pat. No. 9,497,465.

(51) Int. Cl.
| | |
|---|---|
| *H04N 19/122* | (2014.01) |
| *H04N 19/124* | (2014.01) |
| *H04N 19/136* | (2014.01) |
| *H04N 19/157* | (2014.01) |
| *H04N 19/159* | (2014.01) |
| *H04N 19/176* | (2014.01) |
| *H04N 19/44* | (2014.01) |
| *H04N 19/593* | (2014.01) |
| *H04N 19/61* | (2014.01) |
| *H04N 19/625* | (2014.01) |
| *H04N 19/70* | (2014.01) |

(52) U.S. Cl.
CPC ......... *H04N 19/124* (2014.11); *H04N 19/136* (2014.11); *H04N 19/157* (2014.11); *H04N 19/159* (2014.11); *H04N 19/176* (2014.11); *H04N 19/44* (2014.11); *H04N 19/593* (2014.11); *H04N 19/61* (2014.11); *H04N 19/625* (2014.11); *H04N 19/70* (2014.11)

(58) Field of Classification Search
CPC .. H04N 19/157; H04N 19/159; H04N 19/176; H04N 19/44; H04N 19/593; H04N 19/61; H04N 19/625; H04N 19/70; H04N 19/12; H04N 19/186; H04N 19/18; H04N 19/00; H04N 19/103; H04N 19/109; H04N 19/11; H04N 19/19; H04N 19/13; H04N 19/134; H04N 19/139; H04N 19/146; H04N 19/196; H04N 19/30; H04N 19/45; H04N 19/46; H04N 19/50; H04N 19/52; H04N 19/60; H04N 19/63; H04N 19/645; H04N 19/80; H04N 19/88; H04N 19/91; H04N 1/32154–32181; H04N 5/92; H04N 5/9262; H04N 5/9264; H04N 9/80; H04N 9/8045; H04N 9/8047; H04N 9/8082; H04N 11/042; H04N 11/044; H04N 2009/8084; G06T 9/00; G06T 9/007; G06T 2207/20048–20064
See application file for complete search history.

(56) References Cited

U.S. PATENT DOCUMENTS

| | | | |
|---|---|---|---|
| 9,014,262 B2 | 4/2015 | Oh et al. | |
| 9,100,648 B2 | 8/2015 | Kim et al. | |
| 9,374,582 B2 | 6/2016 | Oh et al. | |
| 9,497,465 B2 * | 11/2016 | Kim | H04N 19/593 |
| 9,628,799 B2 | 4/2017 | Kim et al. | |
| 9,661,338 B2 | 5/2017 | Karczewicz et al. | |
| 9,723,311 B2 * | 8/2017 | Kim | H04N 19/159 |
| 11,595,655 B2 * | 2/2023 | Kim | H04N 19/70 |
| 12,010,312 B2 * | 6/2024 | Kim | H04N 19/129 |
| 2003/0156648 A1 | 8/2003 | Holcomb et al. | |
| 2008/0310512 A1 | 12/2008 | Ye et al. | |
| 2010/0061454 A1 | 3/2010 | Park et al. | |
| 2010/0086029 A1 | 4/2010 | Chen et al. | |
| 2011/0317757 A1 | 12/2011 | Coban et al. | |
| 2012/0008683 A1 | 1/2012 | Karczewicz et al. | |
| 2012/0170649 A1 | 7/2012 | Chen et al. | |
| 2012/0201300 A1 | 8/2012 | Kim et al. | |
| 2012/0301040 A1 | 11/2012 | Yie et al. | |
| 2013/0003859 A1 | 1/2013 | Karczewicz et al. | |
| 2013/0034153 A1 | 2/2013 | Song et al. | |
| 2013/0083857 A1 | 4/2013 | Zheng et al. | |
| 2013/0114695 A1 | 5/2013 | Joshi et al. | |
| 2013/0114730 A1 | 5/2013 | Joshi et al. | |
| 2013/0188740 A1 | 7/2013 | Lim et al. | |
| 2014/0098859 A1 | 4/2014 | Lim et al. | |
| 2015/0245077 A1 | 8/2015 | Lim et al. | |
| 2015/0249840 A1 | 9/2015 | Kim et al. | |
| 2015/0326883 A1 | 11/2015 | Rosewarne | |
| 2016/0373746 A1 | 12/2016 | Kim et al. | |
| 2016/0373783 A1 | 12/2016 | Kim et al. | |
| 2017/0180731 A1 | 6/2017 | Oh et al. | |
| 2017/0238015 A1 | 8/2017 | Karczewicz et al. | |
| 2020/0169749 A1 | 5/2020 | Hsu et al. | |
| 2020/0186806 A1 | 6/2020 | Tourapis et al. | |

FOREIGN PATENT DOCUMENTS

| | | |
|---|---|---|
| CN | 102447896 A | 5/2012 |
| JP | 2009-27541 A | 2/2009 |
| KR | 10-2004-0027047 A | 4/2004 |
| KR | 10-0744435 B1 | 8/2007 |
| KR | 10-2012-0012383 A | 2/2012 |
| KR | 10-2012-0062307 A | 6/2012 |
| TW | 200727709 A | 7/2007 |
| TW | 201028010 A1 | 7/2010 |
| TW | 201216254 A | 4/2012 |
| TW | 201223286 A1 | 6/2012 |
| TW | 201225678 A1 | 6/2012 |
| WO | WO 2012/087713 A1 | 6/2012 |

OTHER PUBLICATIONS

Saxena, Ankur et al., "CE7: Mode-dependent DCT/DST without 4*4 full matrix multiplication for intra prediction", *Joint Collaborative Team on Video Coding (JCT-VC) of ITU-T SG16 WP3 and ISO/IEC JTC1/SC29/WG11*, 5th Meeting: Geneva, Switzerland, Mar. 16-23, 2011 (pp. 1-10).

Lan, Cuiling et al. (2012). "Intra transform skipping", Joint Collaborative Team on Video Coding (JCT-VC) of ITU-T SG 16 WP 3 and ISO/IEC JTC 1/SC 29/WG 11. JCTVC-10408. ISO/IEC. 1-6.

W. Zhu, "Non Transform Mode for Inter Coding," Document JCTVC-H0061, Joint Collaborative Team on Video Coding (JCT-VC) of ITU-T SG16 WP3 and ISO/IEC JTC1/SC29/WG11, 8th Meeting, San Jose, Calif., Feb. 1-10, 2012.

Marpe, Detlev, et al. "Context-Based Adaptive Binary Arithmetic Coding in the H. 264/AVC Video Compression Standard." IEEE Transactions on Circuits and Systems for Video Technology, vol. 13, No. 7 (Jul. 2003): 620-636. (17 pages in English).

Ichigaya, Atsuro et al., "Performance report of adaptive DCT/DST selection", *Joint Collaborative Team on Video Coding (JCT-VC) of ITU-T SG16 WP3 and ISO/IEC JTC1/SC29/WG11*, 4th Meeting: Daegu, Republic of Korea, Jan. 19-28, 2011 (5 pages in English).

(56) References Cited

OTHER PUBLICATIONS

Mrak, Marta et al., "Transform skip mode", *Joint Collaborative Team on Video Coding (JCT-VC) of ITU-T SG16 WP3 and ISO/IEC JTC1/SC29/WG11*, 6th Meeting: Torino, Italy, Jul. 14-22, 2011 (9 pages in English).

Bross, Benjamin et al., "High efficiency video coding (HEVC) text specification draft 7", *Joint Collaborative Team on Video Coding (JCT-VC) of ITU-T SG16 WP3 and ISO/IEC JTC1/SC29/WG11*, 9th Meeting: Geneva, Switzerland, Apr. 27-May 7, 2012 (298 pages in English).

International Search Report Issued Oct. 11, 2013 in corresponding International Patent Application No. PCT/KR2013/005616 (5 pages, in Korean with English translation).

Korean Office Action issued Oct. 30, 2014 in corresponding Korean Patent Application No. 10-2014-0087607 (4 pages, in Korean).

Casas, Josep R. et al., "Residual Image Coding Using Mathematical Morphology." Proceedings of ICASSP '94. IEEE International Conference on Acoustics, Speech and Signal Processing. vol. 5, Apr. 1994. doi: 10.1109/ICASSP.1994.389452.

Chen, Chung-Ming, et al., "Window Architecture for Deblocking Filter in H.264/AVC," 2006 IEEE International Symposium on Signal Processing and Information Technology. Aug. 2006. doi: 10.1109/ISSPIT.2006.270822.

Somasundaram, Krishnan et al., "A Pattern-Based Residual Vector Quantization (PBRVQ) Algorithm for Compressing Images," 2009 International Conference on High Performance Computing & Simulation. Jun. 2009. doi: 10.1109/HPCSIM.2009.5192725.

Sun, Chi-Chia et al., "A Configurable IP Core for Inverse Quantized Discrete Cosine and Integer Transforms With Arbitrary Accuracy." 2010 IEEE Asia Pacific Conference on Circuits and Systems. Dec. 2010. doi: 10.1109/APCCAS.2010.5774865.

Bross, Benjamin et al., "High efficiency video coding (HEVC) text specification draft 7," Joint Collaborative Team on Video Coding (JCT-VC) of ITU-T SG16 WP3 and ISO/IEC JTC1/SC29/WG11. May 2012. doc: JCTVC-11003_d9.

Mrak, Martha et al.,"Transform skip mode." Joint Collaborative Team on Video Coding (JCT-VC) of ITU-T SG16 WP3 and ISO/IEC JTC1/SC29/WG11. Jul. 2011. doc: JCTVC-F077_r1.

* cited by examiner

4x4 diagonal scan (a)

4x4 vertical scan (b)

4x4 horizontal scan (c)

METHOD AND DEVICE FOR ENCODING/DECODING IMAGES

CROSS-REFERENCE TO RELATED APPLICATIONS

This application is a continuation of U.S. patent application Ser. No. 18/160,976 filed on Jan. 27, 2023, which is a continuation of U.S. patent application Ser. No. 17/130,042 filed on Dec. 22, 2020, now U.S. Pat. No. 11,595,655 issued on Feb. 28, 2023, which is a continuation of U.S. patent application Ser. No. 16/999,252 filed on Aug. 21, 2020, now U.S. Pat. No. 11,399,186 issued on Jul. 26, 2022, which is a continuation of U.S. patent application Ser. No. 16/413,870 filed on May 16, 2019, now U.S. Pat. No. 10,827,177 issued on Nov. 3, 2020, which is a continuation of U.S. patent application Ser. No. 15/630,831 filed on Jun. 22, 2017, now U.S. Pat. No. 10,341,661 issued on Jul. 2, 2019, which is a continuation of U.S. patent application Ser. No. 15/255,035 filed on Sep. 1, 2016, now U.S. Pat. No. 9,723,311 issued on Aug. 1, 2017, which is a continuation of U.S. patent application Ser. No. 14/406,438 having a 371(c) date of Dec. 8, 2014, now U.S. Pat. No. 9,497,465 issued on Nov. 15, 2016, which is a U.S. national stage application of International Application No. PCT/KR2013/005616 filed on Jun. 25, 2013, which claims the benefit of Korean Patent Applications Nos. 10-2012-0071446 and 10-2013-0073067, filed on Jun. 29, 2012 and Jun. 25, 2013, respectively, in the Korean Intellectual Property Office, the entire disclosures of which are incorporated herein by reference for all purposes.

TECHNICAL FIELD

The present invention relates to the encoding and decoding of an image and, more particularly, to a method of scanning residual signals.

BACKGROUND ART

Broadcast service having High Definition (HD) resolution (1280×1024 or 1920×1080) is extended nationwide and globally. Accordingly, many users are accustomed to video having high resolution and high picture quality. Accordingly, a lot of institutes are giving impetus to the development of the next-generation image device. Furthermore, as there is a growing interest in Ultra High Definition (UHD) having resolution 4 times higher than that of HDTV along with HDTV, moving image standardization organizations have become recognized a need for compression technology for an image having higher resolution and higher picture quality. Furthermore, there is an urgent need for a new standard which can maintain the same picture quality and also have many advantages in terms of a frequency band or storage through higher compression efficiency than that of H.264/AVC that is now used in HDTV, mobile phones, and Blue ray players.

Today, Moving Picture Experts Group (MPEG) and Video Coding Experts Group (VCEG) are jointly standardizing High Efficiency Video Coding (HEVC), that is, the next-generation video codec, and are aiming to encode an image including a UHD image with compression efficiency twice than that of H.264/AVC. This can provide an image having a lower frequency than and higher picture quality than a current image even in 3D broadcasting and a mobile communication network as well as HD and UHD images.

DISCLOSURE

Technical Problem

The present invention provides a method and apparatus for encoding and decoding an image, which are capable of improving encoding and decoding efficiency.

The present invention provides a method and apparatus for scanning residual signals, which are capable of improving encoding and decoding efficiency.

Technical Solution

In accordance with an aspect of the present invention, there is provided an image decoding method. The method includes deriving a scan type for the residual signals of a current block depending on whether or not the current block is a transform skip block and applying the scan type to the residual signals of the current block, wherein the transform skip block is the current block to which transform has not been applied and is specified based on information indicating whether or not to apply the transform to the current block.

The deriving of the scan type for the residual signals of the current block may include driving any one of a vertical scan, a horizontal scan, and an up-right scan as the scan type for the residual signals if the current block is a transform skip block.

The deriving of the scan type for the residual signals of the current block may include setting a scan type, derived based on an intra-prediction mode of the current block, as the scan type for the residual signals if the current block is a transform skip block.

A horizontal scan may be set again as the scan type for the residual signals if the scan type derived based on the intra-prediction mode of the current block is a vertical scan.

A vertical scan may be set again as the scan type for the residual signals if the scan type derived based on the intra-prediction mode of the current block is a horizontal scan.

An up-right scan may be set again as the scan type for the residual signals if the scan type derived based on the intra-prediction mode of the current block is not a vertical scan or a horizontal scan.

The deriving of the scan type for the residual signals of the current block may include deriving any one of a vertical scan, a horizontal scan, and an up-right scan as the scan type for the residual signals of the current block if the current block is a transform skip block and a size of the current block is a specific size or lower.

The specific size may be a 4×4 size.

The deriving of the scan type for the residual signals of the current block may include setting a scan type, deriving based on an intra-prediction mode of the current block, again if the current block is a transform skip block and a size of the current block is a specific size or lower.

A horizontal scan may be set again as the scan type for the residual signals if the scan type derived based on the intra-prediction mode of the current block is a vertical scan.

A vertical scan may be set again as the scan type for the residual signals if the scan type derived based on the intra-prediction mode of the current block is a horizontal scan.

An up-right scan may be set again as the scan type for the residual signals if the scan type derived based on the intra-prediction mode of the current block is not a vertical scan or a horizontal scan.

The specific size may be a 4×4 size.

The deriving of the scan type for the residual signals of the current block may include deriving the scan type for the residual signals of the current block based on an intra-prediction mode of the current block if the current block is not a transform skip block.

In accordance with another aspect of the present invention, there is provided an image decoding apparatus. The apparatus include a scan type deriving module for deriving a scan type for residual signals of a current block depending on whether or not the current block is a transform skip block and a scanning module for applying the scan type to the residual signals of the current block, wherein the transform skip block is the current block to which transform has not been applied and is specified based on information indicating whether or not to apply the transform to the current block.

In accordance with yet another aspect of the present invention, there is provided an image encoding method. The method includes deriving a scan type for residual signals of a current block depending on whether or not the current block is a transform skip block and applying the scan type to the residual signals of the current block, wherein the transform skip block is the current block to which transform has not been applied and is specified based on information indicating whether or not to apply the transform to the current block.

In accordance with further yet another aspect of the present invention, there is provided an image encoding apparatus. The apparatus includes a scan type deriving module for deriving a scan type for residual signals of a current block depending on whether or not the current block is a transform skip block and a scanning module for applying the scan type to the residual signals of the current block, wherein the transform skip block is the current block to which transform has not been applied and is specified based on information indicating whether or not to apply the transform to the current block.

Advantageous Effects

Since a transform process is not performed on a block to which a transform skip algorithm has been applied, a block on which an existing transform process has been performed and the transform skip block have different transform coefficient characteristics. Accordingly, encoding and decoding efficiency for residual signals can be improved by providing a method and apparatus for deriving a scan type, which are suitable for the characteristics of a transform skip block, not a transform coefficient scan method applied to a block on which an existing transform process has been performed.

MODE FOR INVENTION

Hereinafter, some exemplary embodiments of the present invention are described in detail with reference to the accompanying drawings. Furthermore, in describing the embodiments of this specification, a detailed description of the known functions and constitutions will be omitted if it is deemed to make the gist of the present invention unnecessarily vague.

In this specification, when it is said that one element is connected or coupled with the other element, it may mean that the one element may be directly connected or coupled with the other element or a third element may be connected or coupled between the two elements. Furthermore, in this specification, when it is said that a specific element is included, it may mean that elements other than the specific element are not excluded and that additional elements may be included in the embodiments of the present invention or the scope of the technical spirit of the present invention.

Terms, such as the first and the second, may be used to describe various elements, but the elements are not restricted by the terms. The terms are used to only distinguish one element from the other element. For example, a first element may be named a second element without departing from the scope of the present invention. Likewise, a second element may be named a first element.

Furthermore, element units described in the embodiments of the present invention are independently shown to indicate difference and characteristic functions, and it does not mean that each of the element units is formed of a piece of separate hardware or a piece of software. That is, the element units are arranged and included, for convenience of description, and at least two of the element units may form one element unit or one element may be divided into a plurality of element units and the plurality of divided element units may perform functions. An embodiment into which the elements are integrated or embodiments from which some elements are separated are also included in the scope of the present invention, unless they depart from the essence of the present invention.

Furthermore, in the present invention, some elements are not essential elements for performing essential functions, but may be optional elements for improving only performance. The present invention may be implemented using only essential elements for implementing the essence of the present invention other than elements used to improve only performance, and a structure including only essential elements other than optional elements used to improve only performance is included in the scope of the present invention.

Figure 1:
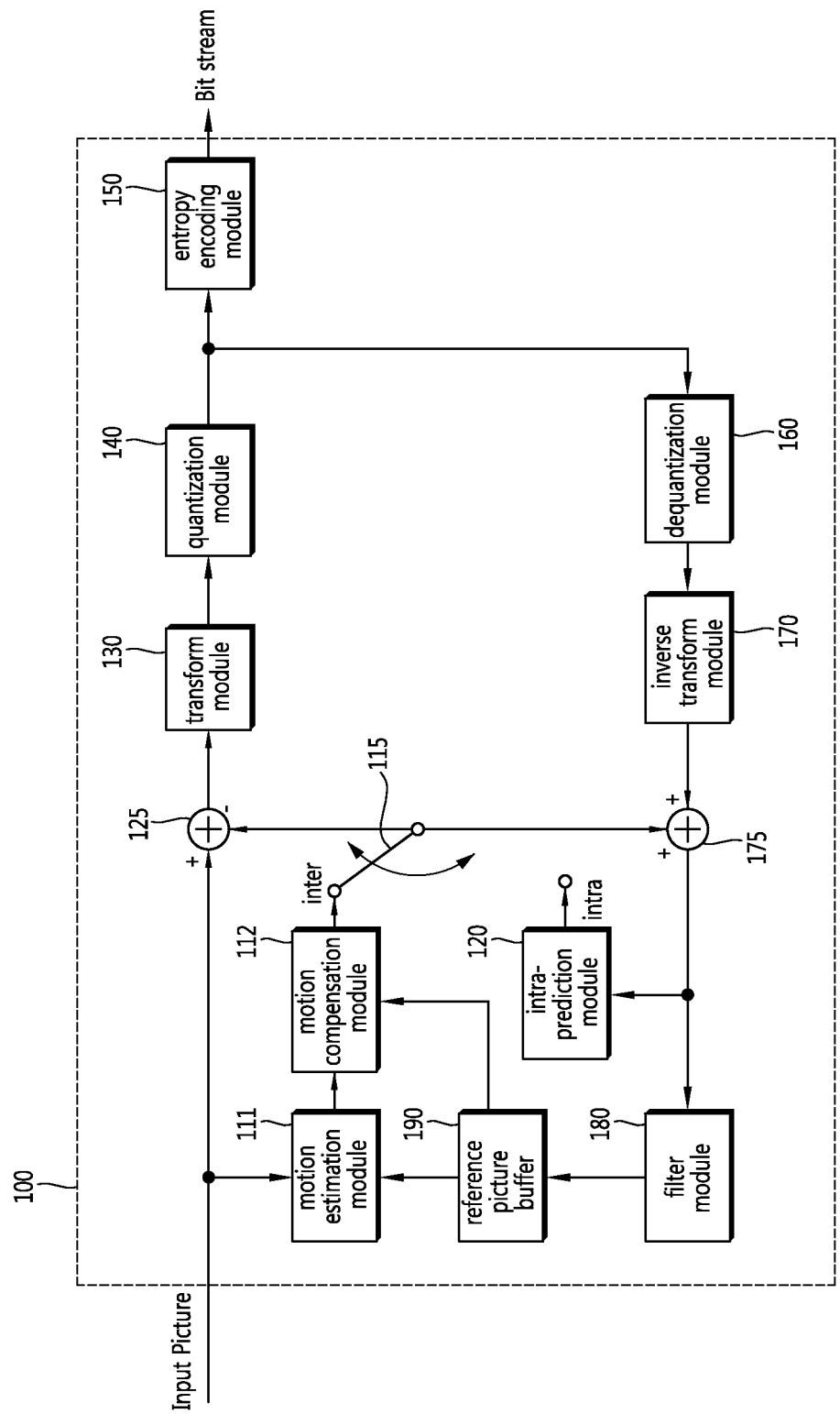
FIG. 1 is a block diagram showing the construction of an image encoding apparatus to which an embodiment of the present invention is applied.

FIG. 1 is a block diagram showing the construction of an image encoding apparatus to which an embodiment of the present invention is applied.

Referring to FIG. 1, the image encoding apparatus 100 includes a motion estimation module 111, a motion compensation module 112, an intra-prediction module 120, a switch 115, a subtractor 125, a transform module 130, a quantization module 140, an entropy encoding module 150, an inverse quantization module 160, an inverse transform module 170, an adder 175, a filter module 180, and a reference picture buffer 190.

The image encoding apparatus 100 can perform encoding on an input image in intra-mode or inter-mode and output a bit stream. In the case of intra-mode, the switch 115 can switch to intra mode. In the case of inter-mode, the switch 115 can switch to inter-mode. Intra-prediction means intra-frame prediction, and inter-prediction means inter-frame. The image encoding apparatus 100 can generate a prediction block for the input block of the input image and then encode a difference between the input block and the prediction block. Here, the input image can mean the original picture.

In the case of intra-mode, the intra-prediction module 120 can generate the prediction block by performing spatial prediction using a value of the pixel of an already encoded block neighboring a current block.

In the case of inter-mode, the motion estimation module 111 can obtain a motion vector by searching a reference picture, stored in the reference picture buffer 190, for a region that is most well matched with the input block in a motion prediction process. The motion compensation module 112 can generate the prediction block by performing motion compensation using the motion vector and the reference picture stored in the reference picture buffer 190. Here, the motion vector is a two-dimensional (2-D) vector used in inter-prediction, and the motion vector can indicate an offset between a picture to be now encoded/decoded and a reference picture.

The subtractor 125 can generate a residual block based on the difference between the input block and the generated prediction block.

The transform module 130 can perform transform on the residual block and output a transform coefficient according to the transformed block. Furthermore, the quantization module 140 can output a quantized coefficient by quantizing the received transform coefficient according to a quantization parameter.

The entropy encoding module 150 can perform entropy encoding on a symbol according to a probability distribution based on values calculated by the quantization module 140, an encoding parameter value calculated in an encoding process, etc. and output a bit stream according to the entropy-coded symbols. If entropy encoding is applied, the size of a bit stream for a symbol to be encoded can be reduced because the symbol is represented by allocating a small number of bits to a symbol having a high incidence and a large number of bits to a symbol having a low incidence. Accordingly, the compression performance of image encoding can be improved through entropy encoding. The entropy encoding module 150 can use such encoding methods as exponential Golomb, Context-Adaptive Binary Arithmetic Coding (CABAC), and Context-Adaptive Binary Arithmetic Coding (CABAC) for the entropy encoding.

The image encoding apparatus 100 according to the embodiment of FIG. 1 performs inter-prediction encoding, that is, inter-frame prediction encoding, and thus a picture that has been coded needs to be decoded and stored in order to be used as a reference picture. Accordingly, a quantized coefficient is dequantization by the dequantization module 160 and inverse transformed by the inverse transform module 170. The dequantized and inversely transformed coefficient is added to the prediction block through the adder 175, thereby generating a reconstructed block.

The reconstructed block experiences the filter module 180. The filter module 180 can apply one or more of a deblocking filter, a Sample Adaptive Offset (SAO), and an Adaptive Loop Filter (ALF) to the reconstructed block or the reconstructed picture. The filter module 180 may also be called an adaptive in-loop filter. The deblocking filter can remove block distortion generated at the boundary of blocks. The SAO can add a proper offset value to a pixel value in order to compensate for a coding error. The ALF can perform filtering based on a value obtained by comparing a reconstructed picture with the original picture. The reconstructed block that has experienced the filter module 180 can be stored in the reference picture buffer 190.

Figure 2:
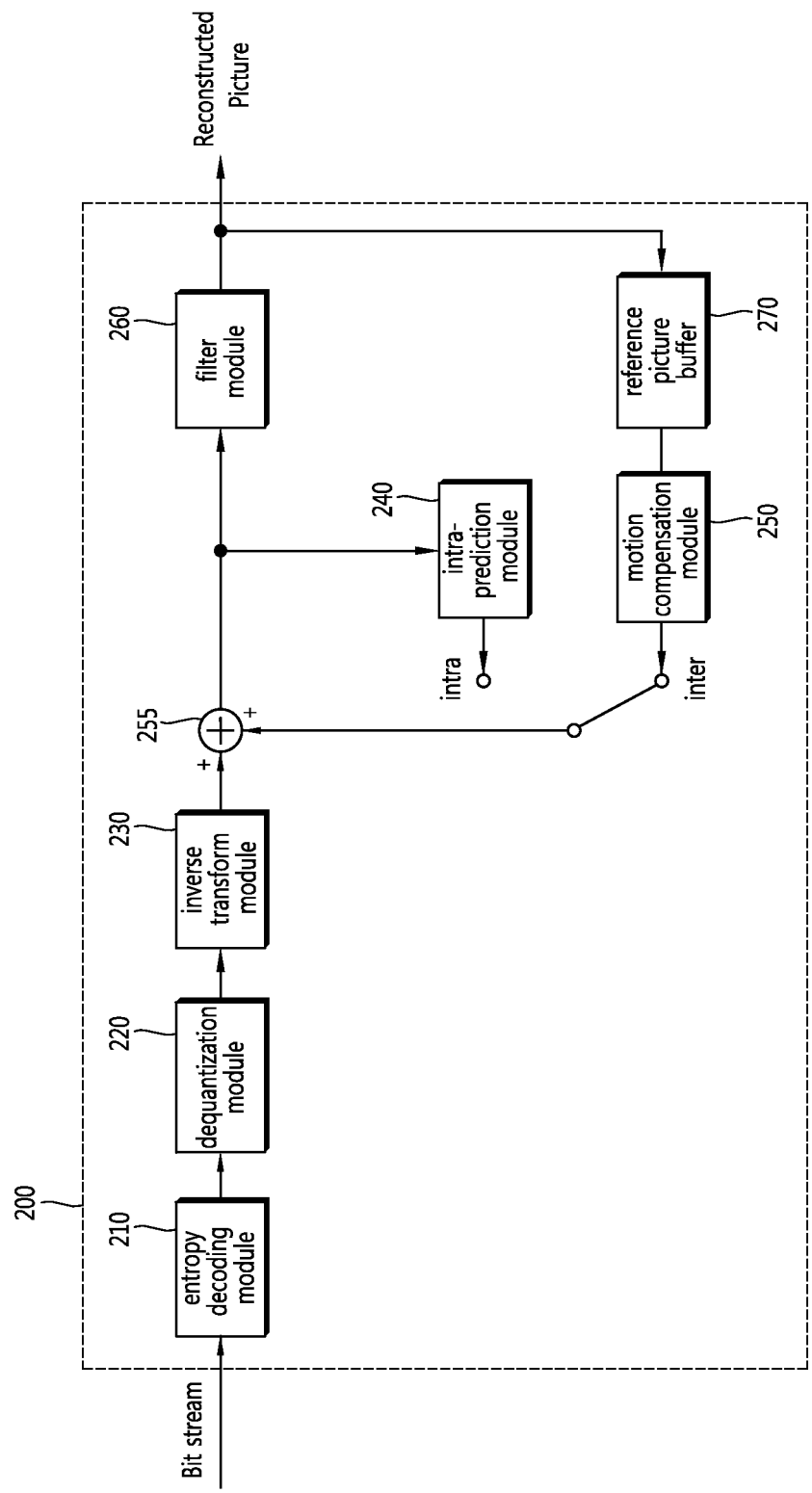
FIG. 2 is a block diagram showing the construction of an image decoding apparatus to which an embodiment of the present invention is applied.

FIG. 2 is a block diagram showing the construction of an image decoding apparatus to which an embodiment of the present invention is applied.

Referring to FIG. 2, the image decoding apparatus 200 includes an entropy decoding module 210, a dequantization module 220, an inverse transform module 230, an intra-prediction module 240, a motion compensation module 250, a filter module 260, and a reference picture buffer 270.

The image decoding apparatus 200 can receive a bit stream outputted from an encoder, perform decoding on the bit stream in intra-mode or inter-mode, and output a reconstructed image, that is, a reconstructed image. In the case of intra-mode, a switch can switch to intra-mode. In the case of inter-mode, the switch can switch to inter-mode.

The image decoding apparatus 200 can obtain a reconstructed residual block from the received bit stream, generate a prediction block, and generate a reconstructed block, that is, a restoration block, by adding the reconstructed residual block to the prediction block.

The entropy decoding module 210 can generate symbols including a symbol having a quantized coefficient form by performing entropy decoding on the received bit stream according to a probability distribution.

If an entropy decoding method is applied, the size of a bit stream for each symbol can be reduced because the symbol is represented by allocating a small number of bits to a symbol having a high incidence and a large number of bits to a symbol having a low incidence.

The quantized coefficient is dequantized by the dequantization module 220 and is inversely transformed by the inverse transform module 230. As a result of the dequantization/inverse transform of the quantized coefficient, a reconstructed residual block can be generated.

In the case of intra-mode, the intra-prediction module 240 can generate the prediction block by performing spatial prediction using a value of the pixel of an already encoded block neighboring a current block. In the case of inter-mode, the motion compensation module 250 can generate the prediction block by performing motion compensation using a motion vector and a reference picture stored in the reference picture buffer 270.

The residual block and the prediction block are added together by an adder 255. The added block experiences the filter module 260. The filter module 260 can apply at least one of a deblocking filter, an SAO, and an ALF to the reconstructed block or the reconstructed picture. The filter module 260 outputs a reconstructed image, that is, a reconstructed image. The reconstructed image can be stored in the reference picture buffer 270 and can be used for inter-frame prediction.

Figure 3:
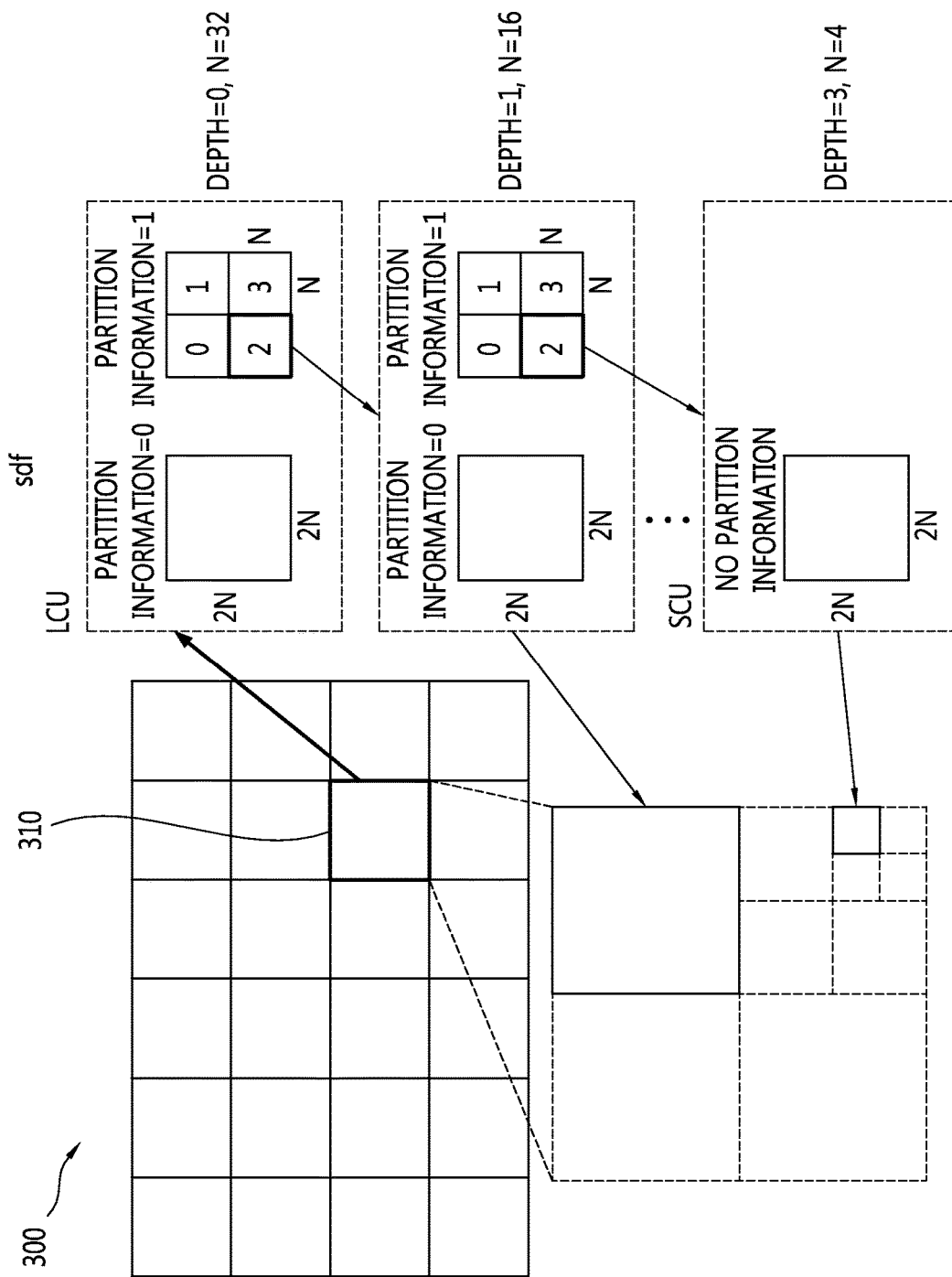
FIG. 3 is a diagram schematically showing the partition structure of an image when encoding the image.

FIG. 3 is a diagram schematically showing the partition structure of an image when encoding the image.

In High Efficiency Video Coding (HEVC), encoding is performed in a coding unit in order to efficiency partition an image.

Referring to FIG. 3, in HEVC, an image 300 is sequentially partitioned in the Largest Coding Unit (hereinafter referred to as an LCU), and a partition structure is determined based on the LCUs. The partition structure means a distribution of Coding Units (hereinafter referred to as CUs) for efficiently encoding an image within the LCU 310. This distribution can be determined based on whether or not one CU will be partitioned into four CUs each reduced by half from the one CU in a width size and a height size. Likewise, the partitioned CU can be recursively partitioned into four CUs each reduced by half from the partitioned CU in a width size and a height size.

Here, the partition of a CU can be recursively performed up to a predetermined depth. Information about the depth is information indicative of the size of a CU, and information about the depth of each CU is stored. For example, the depth of an LCU can be 0, and the depth of the Smallest Coding Unit (SCU) can be a predetermined maximum depth. Here, the LCU is a CU having a maximum CU size as described above, and the SCU is a CU having a minimum CU size.

Whenever partition is performed from the LCU 310 by half in a width size and a height size, the depth of a CU is increased by 1. A CU on which partitions has not been performed has a 2N×2N size for each depth, and a CU on which partition is performed is partitioned from a CU having a 2N×2N size to four CUs each having an N×N size. The size of N is reduced by half whenever the depth is increased by 1.

Referring to FIG. 3, the size of the LCU having a minimum depth of 0 can be 64×64 pixels, and the size of the SCU having a maximum depth of 3 can be 8×8 pixels. Here, the LCU having 64×64 pixels can be represented by a depth of 0, a CU having 32×32 pixels can be represented by a depth of 1, a CU having 16×16 pixels can be represented by a depth of 2, and the SCU having 8×8 pixels can be represented by a depth of 3.

Furthermore, information about whether or not a specific CU will be partitioned can be represented through partition information of 1 bit for each CU. The partition information can be included in all CUs other than the SCU. For example, if a CU is not partitioned, partition information of 0 can be stored. If a CU is partitioned, partition information of 1 can be stored.

Meanwhile, a CU partitioned from the LCU can include a Prediction Unit (PU) (or Prediction Block (PB)), that is, a basic unit for prediction, and a Transform Unit (TU) (or Transform Block (TB)), that is, a basic unit for transform.

Figure 4:
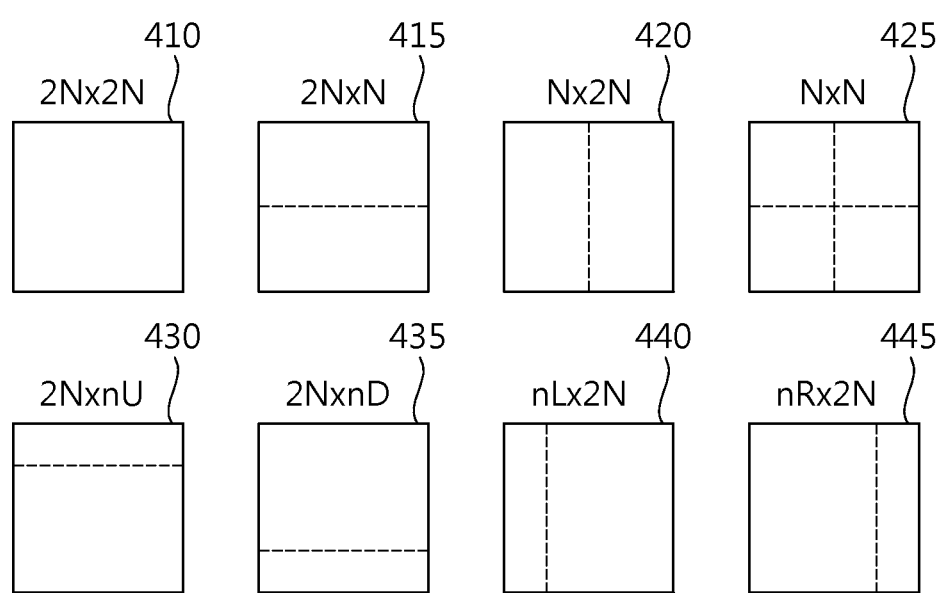
FIG. 4 is a diagram showing the forms of a PU that may be included in a CU.

FIG. 4 is a diagram showing the forms of a PU that may be included in a CU.

A CU that is no longer partitioned, from among CUs partitioned from the LCU, is partitioned into one or more PUs. This behavior itself is also call partition. A Prediction Unit (hereinafter referred to as a PU) is a basic unit on which prediction is performed and encoded in any one of skip mode, inter-mode, and intra mode. The PU can be partitioned in various forms depending on each mode.

Referring to FIG. 4, in the case of skip mode, a 2N×2N mode 410 having the same size as a CU can be supported without partition within the CU.

In the case of inter-mode, 8 partitioned forms, for example, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 can be supported within a CU.

In the case of intra-mode, the 2N×2N mode 410 and the N×N mode 425 can be supported within a CU.

Figure 5:
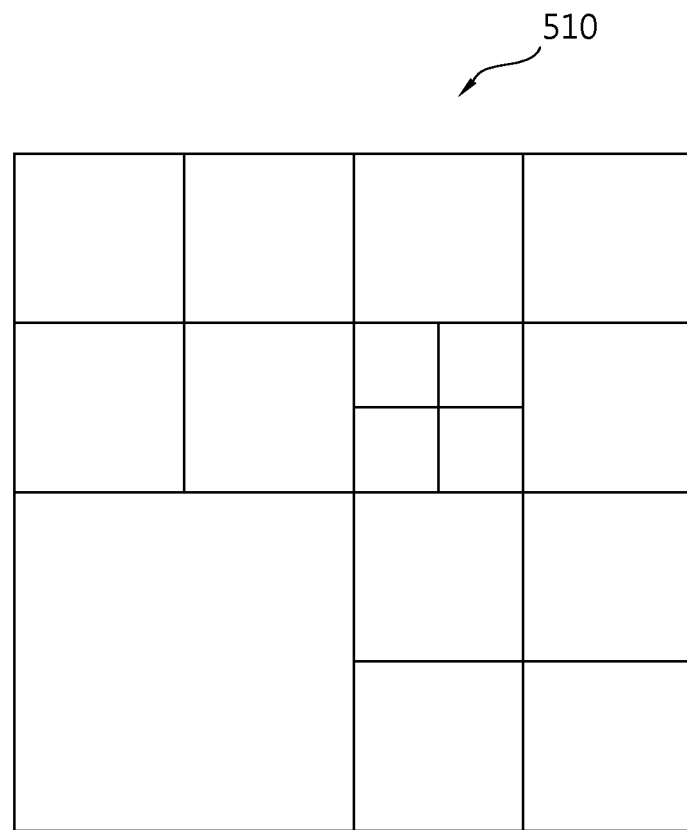
FIG. 5 is a diagram showing the forms of a TU that may be included in a CU.

FIG. 5 is a diagram showing the forms of a TU that may be included in a CU.

A Transform Unit (hereinafter referred to as a TU) is a basic unit used for spatial transform and a quantization/dequantization (scaling) process within a CU. A TU can have a rectangular or square form. A CU that is no longer partitioned, from among CUs partitioned from the LCU, can be partitioned into one or more TUs.

Here, the partition structure of the TU can be a quad-tree structure. For example, as shown in FIG. 5, one CU 510 can be partitioned once or more depending on a quad-tree structure, so that the CU 510 is formed of TUs having various sizes.

Meanwhile, in HEVC, as in H.264/AVC, intra-frame prediction (hereinafter called intra-prediction) encoding is performed. Here, prediction encoding is performed using neighboring blocks located near a current block depending on an intra-prediction mode (or prediction directivity) of the current block. In H.264/AVC, encoding is performed using a prediction mode having 9 directivities. In contrast, in HEVC, encoding is performed using a total of 36 prediction modes including 33 directional prediction modes and 3 non-directional prediction modes.

Figure 6:
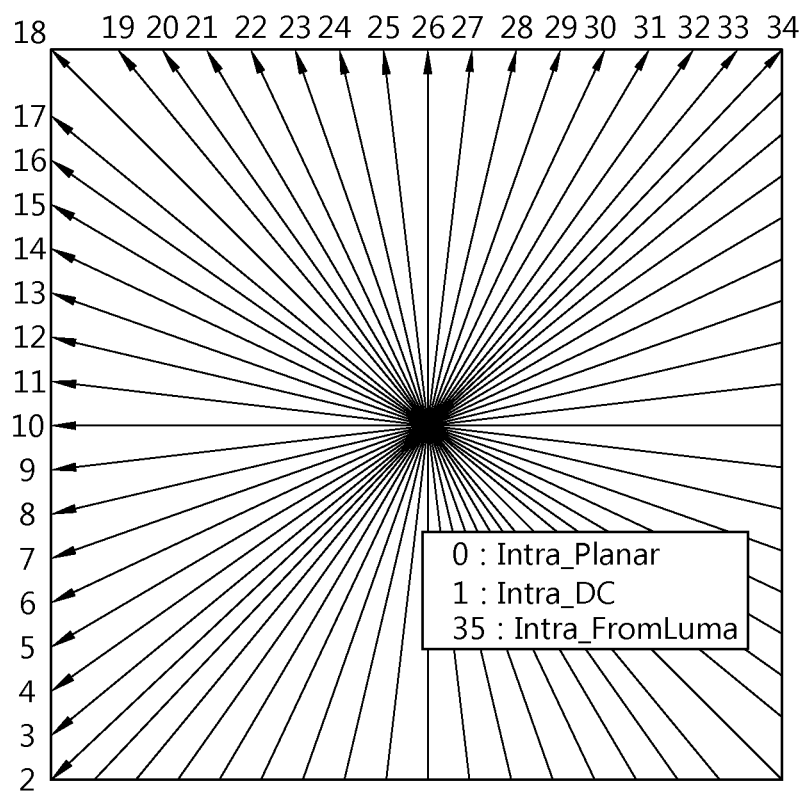
FIG. 6 is a diagram showing an example of intra-prediction modes.

FIG. 6 is a diagram showing an example of intra-prediction modes. Different mode numbers can be assigned to respective intra-prediction mode.

Referring to FIG. 6, a total of 36 intra-prediction modes are present. The total of 36 intra-prediction modes can include 33 directional modes and 3 non-directional modes depending on a direction in which reference pixels used to estimate a pixel value of a current block and/or a prediction method.

The 3 non-directional modes include a planar (Intra_Planar) mode, a DC (Intra_DC) mode, and an LM mode (Intra_FromLuma) in which a chroma signal is derived from a restored luma signal. In intra-prediction, all the 3 non-directional modes may be used or some of them may be used. For example, only the planar mode and the DC mode may be used, and the LM mode may not be used.

Encoding for 36 intra-prediction modes, such as those shown in FIG. 6, can be applied to a luma signal and a chroma signal. For example, in the case of a luma signal, modes other than the LM mode of the 36 intra-prediction modes can be encoded. In the case of a chroma signal, an intra-prediction mode can be encoded using three methods as in Table 1.

Table 1 is an example of an encoding method for an intra-prediction mode of a chroma signal.

TABLE 1

| Chroma intra-prediction coding mode | Intra-prediction scan mode for luma signal | | | | | |
|---|---|---|---|---|---|---|
| | 0 | 26 | 10 | 1 | X (0 <= X < 35) | |
| 0 | 34 | 0 | 0 | 0 | 0 (Planar) | |
| 1 | 26 | 34 | 26 | 26 | 26 (Vert.) | |
| 2 | 10 | 10 | 34 | 10 | 10 (Hor.) | EM |
| 3 | 1 | 1 | 1 | 34 | 1 (DC) | |
| 4 | LM | LM | LM | LM | LM | LM |
| 5 | 0 | 26 | 10 | 1 | X | DM |

Methods of encoding intra-prediction modes of 3 chroma signals are described with reference to Table 1. A first method is to use a Derived Mode (DM) in which an intra-prediction mode of a luma signal is applied to an intra-prediction mode of a chroma signal without change. A second method is to use a coding mode (Explicit Mode (EM)) in which an actual intra-prediction mode is applied. An intra-prediction mode of a chroma signal which is encoded in the EM mode includes a planar mode Planar, a DC mode DC, a horizontal mode Hor, a vertical mode Ver, and a mode at an eighth place vertically (i.e., Ver+8 or No. 34 mode). A third method is to use an LM mode in which a chroma signal is predicted from a restored luma signal. The most efficient methods of the three encoding methods can be selected.

A prediction image for a signal obtained by performing prediction using the above-described intra-prediction mode can have a residual value with the original image. A residual image having the residual value between the prediction image and the original image can be subject to frequency domain transform and quantization and then to entropy coding.

In order to improve entropy coding efficiency, the coefficients of the quantized image having a 2-D form can be arrayed in a 1-D form. When arraying the quantization coefficients again, a zigzag scan method is used in an image encoding method, such as existing H.264/AVC, but an up-right scan method is basically used in HEVC.

Furthermore, frequency domain transform can include integer transform, Discrete Cosine Transform (DCT), Discrete Sine Transform (DST), and intra-prediction mode-dependent DCT/DST.

Figure 7:
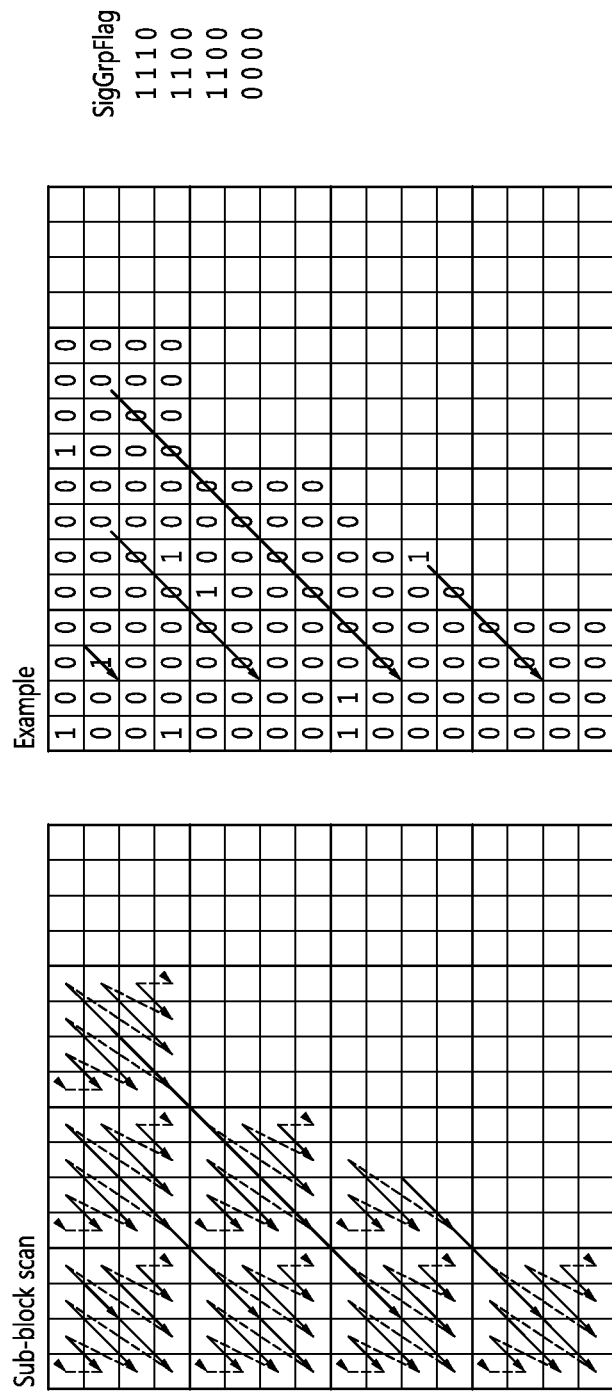
FIG. 7 is a diagram showing an example of an up-right scan method for transform coefficients.

FIG. 7 is a diagram showing an example of an up-right scan method for transform coefficients.

When encoding quantization coefficients for a block having a specific size, the block having a specific size can be partitioned into 4×4 size subblocks and encoded.

Referring to FIG. 7, a 16×16 size block can be partitioned into 16 4×4 size subblocks and encoded. In a decoding process, whether or not a transform coefficient is present in each subblock can be checked based on flag information parsed from a bit stream. For example, the flag can be significant_coeff_group_flag (sigGrpFlag). If a value of significant_coeff_group_flag is 1, it may mean that any one transform coefficient quantized into a corresponding 4×4 subblock is present. In contrast, if a value of significant_coeff_group_flag is 0, it may mean that any transform coefficient quantized into a corresponding 4×4 subblock is not present. An up-right scan type has been basically used in a scan type (or scan order) for the 4×4 subblocks shown in FIG. 7 and a scan type for significant_coeff_group_flag.

Although an up-right scan method has been illustrated as being applied in FIG. 7, a scan method for a quantization coefficient includes up-right, horizontal, and vertical scans. For example, the up-right scan method can be basically used in inter-prediction, and the up-right, horizontal, and vertical scan methods can be selectively used in intra-prediction.

A scan type in intra-prediction can be differently selected depending on an intra-prediction mode, which can be applied to both a luma signal and a chroma signal. Table 2 below shows an example of a method of determining a scan type according to an intra-prediction mode.

TABLE 2

| | log2TrafoSize − 2 | | | |
|---|---|---|---|---|
| IntraPredModeValue | 0 | 1 | 2 | 3 |
| 0 | 0 | 0 | 0 | 0 |
| 1 | 0 | 0 | 0 | 0 |
| 2-5 | 0 | 0 | 0 | 0 |
| 6-14 | 2 | 2 | 0 | 0 |
| 15-21 | 0 | 0 | 0 | 0 |
| 22-30 | 1 | 1 | 0 | 0 |
| 31-35 | 0 | 0 | 0 | 0 |

In Table 2, IntraPredMode Value means an intra-prediction mode. Here, in the case of a luma signal, IntraPredMode Value corresponds to a value of IntraPredMode. In the case of a chroma signal, IntraPredModeValue corresponds to a value of IntraPredModeC. log 2TrafoSize means that the size of a current transform block is indicated by a log. For example, when a value of IntraPredMode Value is 1, it means a DC mode (DC; Intra_DC). When a value of log 2TrafoSize-2 is 1, it means an 8×8 size block.

Furthermore, in Table 2, numbers 0, 1, and 2 determined by the intra-prediction mode 'IntraPredMode Value' and the current transform block size 'log 2TrafoSize' indicate scan types. For example, an up-right scan type can be indicated by 0, a horizontal scan type can be indicated by 1, and a vertical scan type can be indicated by 2.

Figure 8:
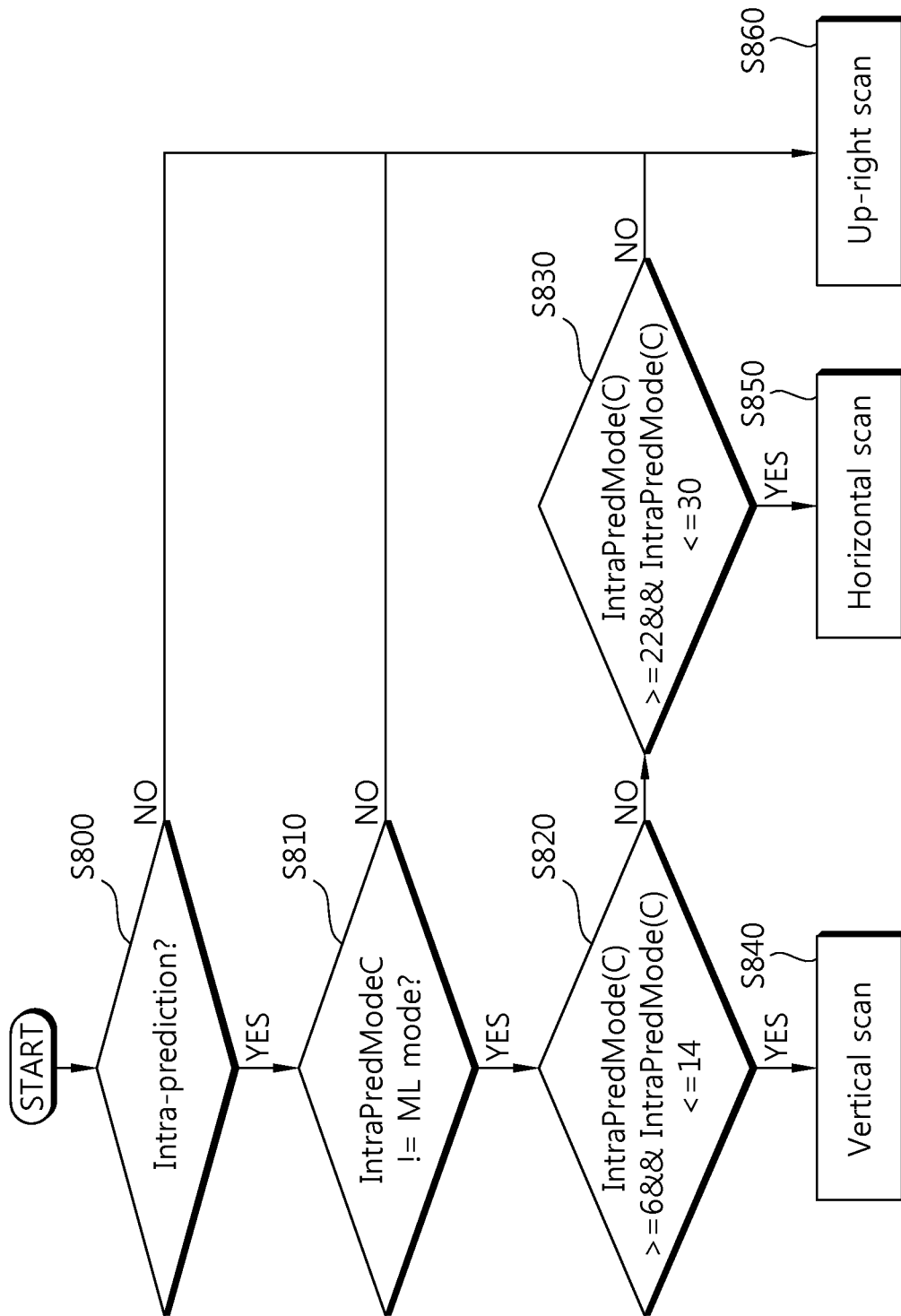
FIG. 8 is a flowchart illustrating an embodiment of a method for determining a scan type according to an intra-prediction mode.

FIG. 8 is a flowchart illustrating an embodiment of a method for determining a scan type according to an intra-prediction mode.

The method of FIG. 8 can be performed in the encoding apparatus of FIG. 1 or the decoding apparatus of FIG. 2. In the embodiment of FIG. 8, although the method of FIG. 8 is illustrated as being performed in the encoding apparatus for convenience of description, the method of FIG. 8 can also be equally applied to the decoding apparatus.

In FIG. 8, IntraPredMode means an intra-prediction mode for a luma signal, and IntraPredModeC means an intra-prediction mode for a chroma signal. IntraPredMode(C) may mean an intra-prediction mode for a luma signal or a chroma signal depending on the components of the signal.

Referring to FIG. 8, if a current block is not an intra-prediction mode at step S800, the encoding apparatus determines that an up-right scan is used as a scan for residual signals at step S860.

If the current block is an intra-prediction mode and IntraPredModeC for a chroma signal is an LM mode at step S810, the encoding apparatus determines that an up-right scan is used as a scan for residual signals at step S860.

If the current block is an intra-prediction mode and IntraPredModeC for the chroma signal is not an LM mode at step S810, the encoding apparatus determines a scan type for residual signals depending on IntraPredMode(C) of the current block.

If a mode value of IntraPredMode(C) of the current block is 6 or more and 14 or less at step S820, the encoding apparatus determines that a vertical scan is used as a scan for residual signals at step S840.

If the mode value of IntraPredMode(C) is not 6 or more and 14 or less and the mode value of IntraPredMode(C) of the current block is 22 or more and 30 or less at step S830, the encoding apparatus determines that a horizontal scan is used as a scan for residual signals at step S850.

If not, that is, the mode value of IntraPredMode(C) is 6 or more and 14 or less and is not 22 or more and 30 or less, the encoding apparatus determines that an up-right scan is used as a scan for residual signals at step S860.

Meanwhile, as described above, a residual value (or residual signal or residual) between the original image and the prediction image is subject to frequency domain transform and quantization and then entropy coding. Here, in order to improve encoding efficiency attributable to the frequency domain transform, integer transform, DCT, DST, and intra-prediction mode-dependent DCT/DST are selectively applied depending on the size of a block.

Furthermore, in order to improve encoding efficiency, a transform skip algorithm can be applied to screen content, such a document image or a presentation image of Power-Point. If the transform skip algorithm is applied, a residual value (or residual signal or residual) between the original image and a prediction image is directly quantized and then subject to entropy coding without a frequency transform process. Accordingly, a frequency transform process is not performed on a block to which the transform skip algorithm has been applied.

Figure 9:
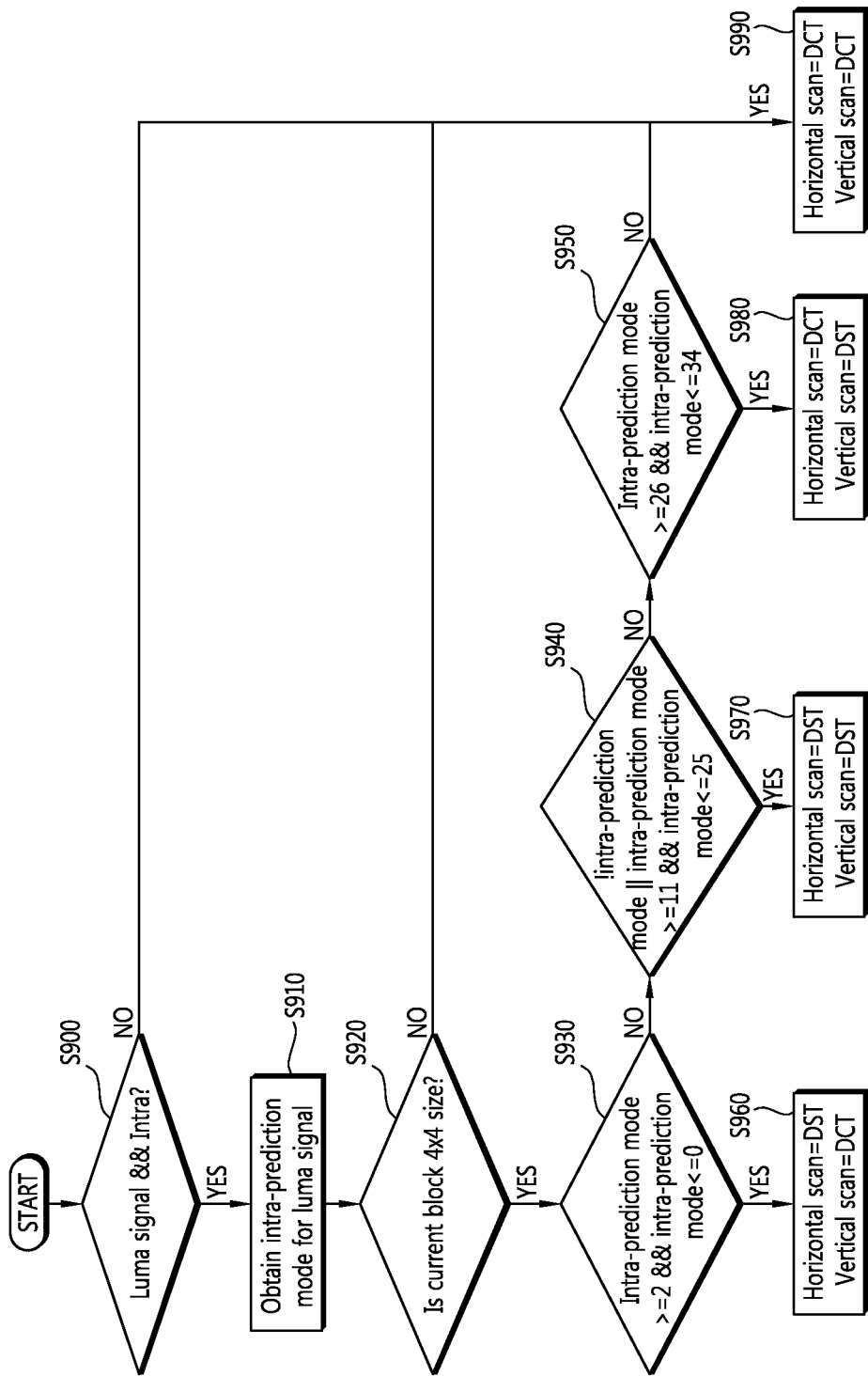
FIG. 9 is a flowchart illustrating an example of a method of selecting a frequency transform method for residual signals (or residual image)

FIG. 9 is a flowchart illustrating an example of a method of selecting a frequency transform method for residual signals (or residual image).

The method of FIG. 9 can be performed in the encoding apparatus of FIG. 1 or the decoding apparatus of FIG. 2. Although the method of FIG. 9 is illustrated as being performed in the encoding apparatus in the embodiment of FIG. 9 for convenience of description, the method of FIG. 9 can also be equally applied to the decoding apparatus.

Referring to FIG. 9, if a current block has been encoded in an intra-prediction mode and is not a block of a luma signal at step S900, the encoding apparatus uses integer transform or DCT as a frequency transform method for the residual images of the luma and chroma signals of the current block at step S990.

If the current block has been encoded in an intra-prediction mode and is a block of a luma signal at step S900, the encoding apparatus obtains IntraPredMode for the luma signal of the current block at step S910.

The encoding apparatus checks whether or not the current block is a block of a 4×4 size (iWidth==4) at step S920.

If, as a result of the check, the current block is not a block of a 4×4 size (iWidth==4), the encoding apparatus uses integer transform or DCT as a frequency transform method for the residual images of the luma and chroma signals of the current block at step S990.

If, as a result of the check, the current block is a block of a 4×4 size (iWidth==4), the encoding apparatus checks an intra-prediction mode of the current block.

If, as a result of the check, a mode value of the intra-prediction mode of the current block is 2 or more and 10 or less at step S930, the encoding apparatus uses DST in a horizontal direction and DCT in a vertical direction as a frequency transform method for the luma signal of the current block at step S960. DCT can be used as the frequency transform method for the chroma signal of the current block in both the horizontal and vertical direction.

If, as a result of the check at step S930, the mode value of the intra-prediction mode of the current block is 0 or 11 or more and 25 or less at step S940, the encoding apparatus uses DST in both the horizontal and vertical directions as a frequency transform method for the luma signal of the current block at step S970. DCT can be used as the frequency transform method for the chroma signal of the current block in both the horizontal and vertical directions.

If, as a result of the check at step S940, the mode value of the intra-prediction mode of the current block is 26 or more and 34 or less at step S950, the encoding apparatus uses DCT in a horizontal direction and DST in a vertical direction as a frequency transform method for the luma signal of the current block at step S980. DCT can be used as a frequency transform method for the chroma signal of the current block in both the horizontal and vertical directions.

If, as a result of the check at step S950, the mode value of the intra-prediction mode of the current block is not 26 or more and not 34 or less, the encoding apparatus used DCT in both the horizontal and vertical directions as a frequency transform method for the residual images of the luma and chroma signals of the current block at step S990.

In FIG. 9, 'iWidth' is an indicator indicative of the size of a transform block, and a value of iWidth according to the size of each transform block can be assigned as follows.

For example, if the size of a transform block is 64×64, a value of iWidth can be 64. If the size of a transform block is 32×32, a value of iWidth can be 32. If the size of a transform block is 16×16, a value of iWidth can be 16. If the size of a transform block is 8×8, a value of iWidth can be 8. If the size of a transform block is 4×4, a value of iWidth can be 4. If the size of a transform block is 2×2, a value of iWidth can be 2.

In relation to the contents of FIG. 9, a transformation process for scaled transform coefficients is as follows.

In this case, input is as follows.

The width of a current transform block; nW

The height of the current transform block; nH

An array of transform coefficients having an element dij; (nW×nH) array d

Information indicating whether or not the transform skip algorithm has been applied to the current transform block An index for the luma signal and the chroma signal of the current transform block; cIdx If cIdx is 0, it means a luma signal. If cIdx is 1 or cIdx is 2, it means a chroma signal. Furthermore, if cIdx is 1, it means Cb in a chroma signal. If cIdx is 2, it means Cr in a chroma signal.

A quantization parameter; qP

In this case, output is as follows.

An array for a residual block obtained by performing inverse transform on the scaled transform coefficients; (nW×nH) array r If coding mode 'PredMode' for a current block is intra-prediction mode, a value of Log2(nW*nH) is 4, and a value of cIdx is 0, parameters 'horizTrType' and 'vertTrType' are obtained through Table 3 below depending on intra-prediction mode of a luma signal. If not, the parameters 'horizTrType' and 'vertTrType' are set to 0.

TABLE 3

| | IntraPredMode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| vertTrType | 1 | 0 | 0 | 0 | 0 | 0 | 0 | 0 | 0 | 0 | 0 | 1 | 1 | 1 | 1 | 1 | 1 | 1 |
| horizTrType | 1 | 0 | 1 | 1 | 1 | 1 | 1 | 1 | 1 | 1 | 1 | 1 | 1 | 1 | 1 | 1 | 1 | 1 |
| | IntraPredMode | | | | | | | | | | | | | | | | | |
| | 18 | 19 | 20 | 21 | 22 | 23 | 24 | 25 | 26 | 27 | 28 | 29 | 30 | 31 | 32 | 33 | 34 | |
| vertTrType | 1 | 1 | 1 | 1 | 1 | 1 | 1 | 1 | 1 | 1 | 1 | 1 | 1 | 1 | 1 | 1 | 1 | |
| horizTrType | 1 | 1 | 1 | 1 | 1 | 1 | 1 | 1 | 0 | 0 | 0 | 0 | 0 | 0 | 0 | 0 | 0 | |

A residual signal for the current block is obtained according to the following sequence.

First, if the transform skip algorithm for the current block has been applied, the following process is performed.

1. If cIdx is 0, shift=13−BitDepthY. If not, shift=13−BitDepthC.
2. An array rij (i=0 . . . (nW)−1, j=0 . . . (nH)−1) for the residual block is set as follows. If the shift is greater than 0, rij=(dij+(1<<(shift−1)))>>shift. If not, rij=(dij<<(−shift)).

If the transform skip algorithm for the current block has not been applied, the following process is performed.

An inverse transform process is performed on scaled transform coefficients using values of the parameters 'horizTrType' and 'vertTrType'. First, the size (nW, nH) of the current block, an array '(nW×nH) array d' for the scaled transform coefficients, and the parameter 'horizTrType' are received, and an array '(nW×nH) array e' is outputted by performing 1-D inverse transform horizontally.

Next, the array '(nW×nH) array e' is received, and the array '(nW×nH) array g' is derived as in Equation 1.

$$g_{ij} = Clip3(-32768, 32767, (e_{ij} + 64) \gg 7)$$ [Equation 1]

Next, the size (nW, nH) of the current block, the array 'nW×nH array g', and the parameter 'vertTrType' are received, and 1-dimensional inverse transform is performed horizontally.

Next, an array '(nW×nH) array r' for the residual block is set as in Equation 17 below depending on cIdx.

$$r_{ij} = (f_{ij} + (1 \ll (shift - 1))) \gg shift$$ [Equation 2]

In Equation 2, the shift=20−BitDepthY when cIdx is 0. If not, the shift=20−BitDepthC. BitDepth means the number of bits (e.g., 8 bits) of a sample for the current image.

Meanwhile, as described above, a frequency transform process is not performed on a block to which a transform skip algorithm has been applied (hereinafter referred to as a transform skip block). Accordingly, a block to which an existing frequency transform process has been performed and a transform skip block have different transform coefficient characteristics. That is, encoding efficiency can be reduced if a transform coefficient scan method applied to a block on which an existing frequency transform process has been performed is applied to a transform skip block. Accordingly, the present invention provides a coefficient scan method which can be applied to a transform skip block.

Figure 10:
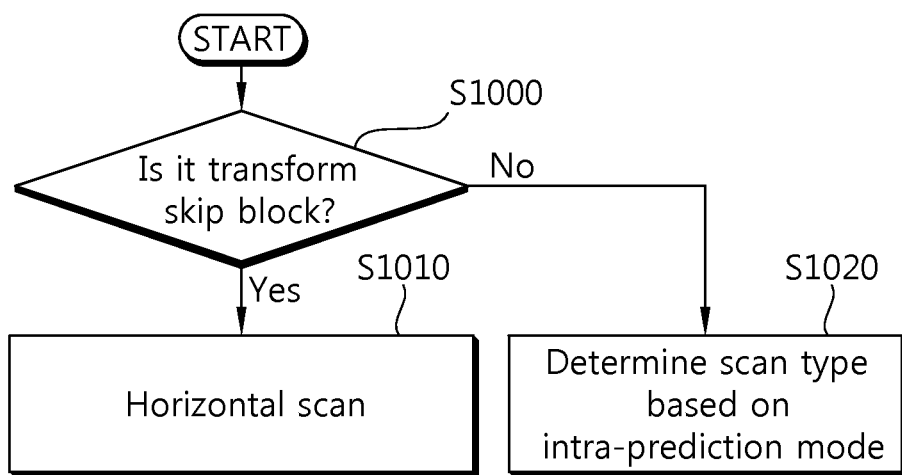
FIG. 10 is a flowchart illustrating a method of deriving a scan type for residual signals (or transform coefficients) in accordance with an embodiment of the present invention.

[Embodiment 1] Method and Apparatus for Unifying a Scan Type for all Transform Skip Blocks FIG. 10 is a flowchart illustrating a method of deriving a scan type for residual signals (or transform coefficients) in accordance with an embodiment of the present invention.

The method of FIG. 10 can be performed in the encoding apparatus of FIG. 1 or the decoding apparatus of FIG. 2. Although the method of FIG. 10 is illustrated as being performed in the encoding apparatus in the embodiment of FIG. 10 for convenience of description, the method of FIG. 10 can also be equally applied to the decoding apparatus.

Referring to FIG. 10, a scan type for the residual signals (or transform coefficients) of a current block can be determined depending on whether or not a transform skip algorithm has been applied to the current residual signal.

If, as a result of the determination at step S1000, it is determined that the residual signals (or transform coefficients) of the current block is a transform skip block, the encoding apparatus determines a horizontal scan as the scan type for the residual signals of the current block at step S1010.

If, as a result of the determination at step S1000, it is determined that the residual signals (or transform coefficients) of the current block is not a transform skip block, the encoding apparatus determines the scan type for the residual signals of the current block based on an intra-prediction mode of the current block at step S1020. For example, any one of up-right, horizontal, and vertical scans can be derived as the scan type for the residual signal based on an intra-prediction mode of the current block. In this case, for example, the method of FIG. 8 can be used.

In the embodiment of FIG. 10, a horizontal scan has been illustrated as a scan type for the residual signals of the current block when the current block is a transform skip block. However, this is only an example, and the present invention is not limited to the example. For example, if a current block is a transform skip block, an up-right scan or a vertical scan may be determined as a scan type for the residual signals of the current block.

Figure 11:
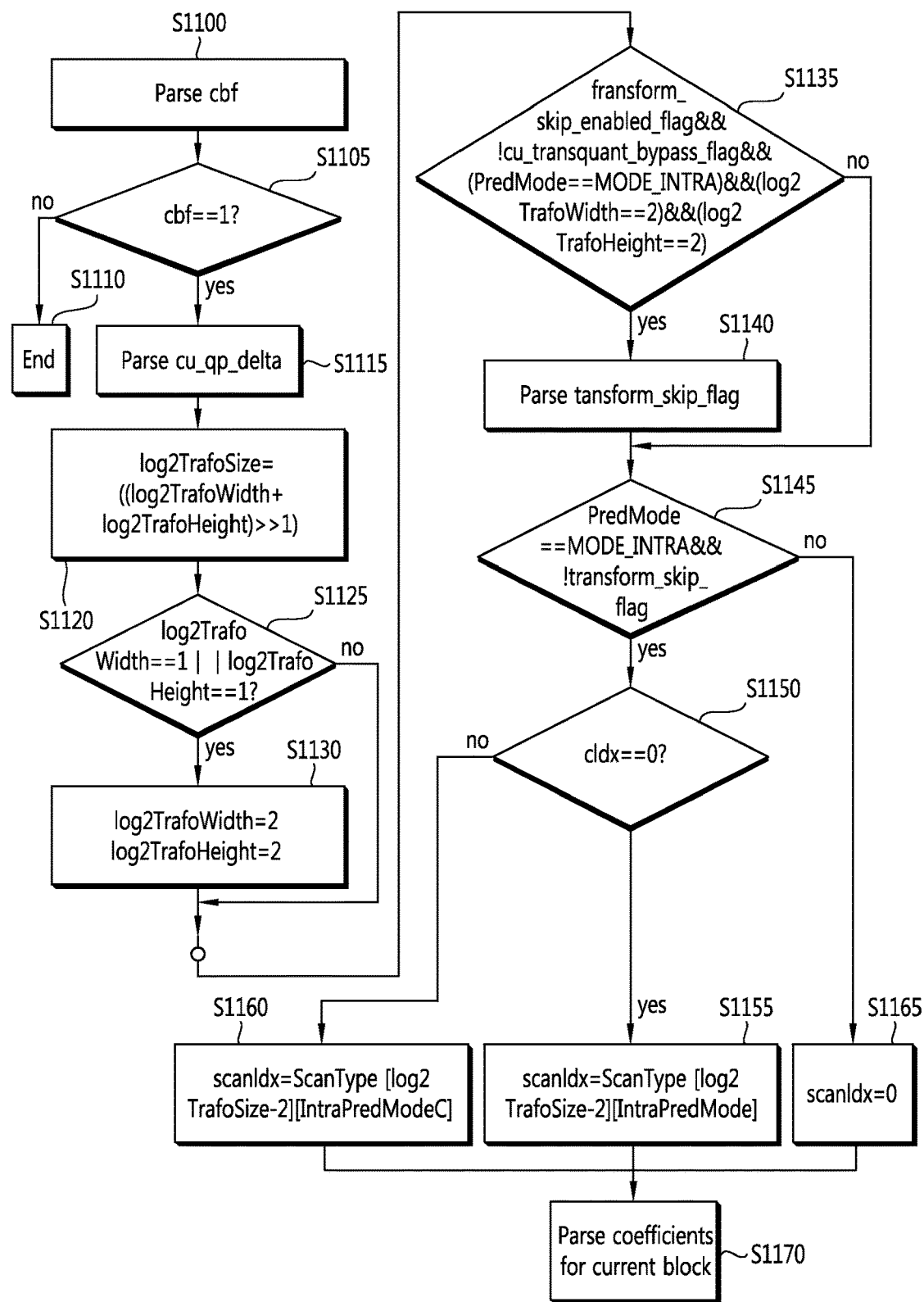
FIG. 11 is a flowchart illustrating a method of deriving a scan type for residual signals (or transform coefficients) in accordance with another embodiment of the present invention.

FIG. 11 is a flowchart illustrating a method of deriving a scan type for residual signals (or transform coefficients) in accordance with another embodiment of the present invention.

The method of FIG. 11 can be performed in the encoding apparatus of FIG. 1 or the decoding apparatus of FIG. 2. Although the method of FIG. 11 is illustrated as being performed in the encoding apparatus in the embodiment of FIG. 11 for convenience of description, the method of FIG. 11 can also be equally applied to the decoding apparatus.

Referring to FIG. 11, the encoding apparatus parses information indicating whether or not residual signals (or transform coefficients) is present in a current block at step S1100.

For example, the information indicating whether or not residual signals are present in a current block can be 'cbf(coded block flag)'. If the residual signals are present in the current block, that is, if one or more transform coefficients other than 0 are included in the current block, a value of cbf can be 1. If the residual signals are not present in the current block, a value of cbf can be 0.

If the information indicating whether or not residual signals are present in a current block indicates that the residual signals are present in the current block, for example, when a value of cbf is 1 at step S1105, a next process is performed. If the information indicating whether or not residual signals are present in a current block indicates that the residual signals are not present in the current block, for example, when a value of cbf is 0 at step S1105, the process of deriving a scan type shown in FIG. 11 is terminated at step S1110.

If the information indicating whether or not residual signals are present in a current block indicates that the residual signals are present in the current block (e.g., cbf=1), the encoding apparatus parses information indicative of a residual value in a step of quantizing the current block at step S1115. For example, information indicating a residual value in the step of quantizing the current block can be a parameter 'cu_qp_delta'.

The information (i.e., cu_qp_delta) indicating a residual value in the step of quantizing the current block is not related to the deriving of a scan type for the residual signals of the current block. Accordingly, step S1115 may be omitted, and next step S1120 may be performed.

The encoding apparatus sets information about the size of the current block at step S1120.

For example, the information about the size of the current block can be set using a parameter 'log 2TrafoSize'. The parameter 'log 2TrafoSize' can be a value obtained by right shifting and performing operations for the sum of 'log 2TrafoWidth' indicating the width of the current block and 'log 2TrafoHeight' indicating the height of the current block. Here, the parameter 'log 2TrafoSize' means the size of a TU block for a luma signal.

If any one of the width and height 'log 2TrafoWidth' and 'log 2TrafoHeight' of the current block is 1 (i.e., the width and height of the current block have a size of 2) at step S1125, the encoding apparatus sets both the width and height 'log 2TrafoWidth' and 'log 2TrafoHeight' of the current block to 2 at step S1130. That is, the width and height of the current block are set as a size of 4.

If a transform skip algorithm has been generally applied to a current picture including the current block (i.e., transform_skip_enabled_flag==1), a mode is not a mode in which transform and quantization are not performed (i.e., !cu_tranquant_bypass_flag), the coding mode of the current block has been coded in an intra-prediction mode (i.e., PredMode==MODE_INTRA), and both the width and height 'log 2TrafoWidth' and 'log 2TrafoHeight' of the current block are 2 at step S1135, the encoding apparatus parses information indicating whether or not to apply transform to the current block, for example, transform_skip_flag at step S1140.

If the coding mode of the current block has been coded in an intra-prediction mode (i.e., PredMode==MODE_INTRA) and the information indicating whether or not to apply transform to the current block indicates that transform is not applied to the current block, for example, a value of transform_skip_flag is 0 (i.e., if the current block is a transform skip block), the encoding apparatus can determine a scan type for the residual signals of the current block based on an intra-prediction mode of the current block as described above with reference to FIG. 8 at steps S1150 to S1160.

For example, if a value of cIdx, that is, an indicator indicating the color component of the current block, is 0 at step S1150, that is, if the current block is a luma signal, a scan type for the residual signals of the current block can be determined based on IntraPredMode for the luma signal of the current block at step S1155. If a value of cIdx of the current block is not 0 at step S1150, that is, if the current block is a chroma signal, a scan type for the residual signals of the current block can be determined based on IntraPredModeC for the chroma signal of the current block at step S1160.

Here, scanIdx can be an index value indicative of a scan type for the residual signals of the current block. For example, if a value of scanIdx is 0, it can indicate an up-right scan. If a value of scanIdx is 1, it can indicate a horizontal scan. If a value of scanIdx is 2, it can indicate a vertical scan. ScanType can be a table indicating a scan type that is determined by the intra-prediction modes of Table 2 and the size of the current block. IntraPredMode means an intra-prediction mode for a luma signal, and IntraPredModeC means an intra-prediction mode for a chroma signal.

If the coding mode of the current block has been coded in an intra-prediction mode (i.e., PredMode==MODE_INTRA) and the information indicating whether or not to apply transform to the current block indicates that transform is applied to the current block at step S1145, for example, if a value of transform_skip_flag is 1 (i.e., the current block is a transform skip block), the encoding apparatus determines any one of up-right, horizontal, and vertical scans as a scan type for the residual signals of the current block at step S1165. For example, a value of scanIdx can be set to 0, and an up-right scan can be determined as a scan type for the residual signals of the current block.

In the present embodiment, an up-right scan has been determined as a scan type for the residual signals of a current block when the current block is a transform skip block. However, this is only an example, and the present invention is not limited to the example. For example, if a current block is a transform skip, a horizontal scan (scanIdx=1) or a vertical scan (scanIdx=2) may be set as a scan type for the residual signals of the current block.

The encoding apparatus parses coefficients for the current block using the determined scan type at step S1170.

Figure 12:
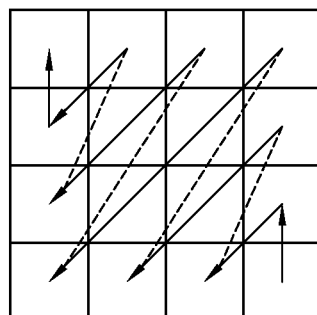
FIG. 12 is a diagram showing examples of scan types to which the present invention can be applied.
Figure 12:
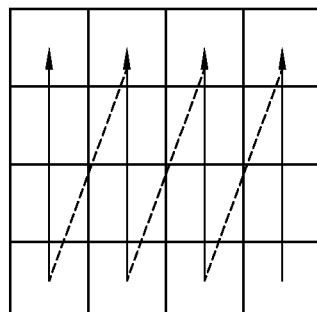
Figure 12:
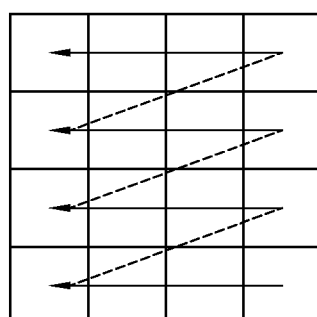

FIG. 12 is a diagram showing examples of scan types to which the present invention can be applied.

FIG. 12(a) shows an example in which a diagonal scan (or up-right scan) is applied to a 4×4 size block. Residual signals (or transform coefficients) within the 4×4 size block can be scanned in order, such as that of FIG. 12(a).

The diagonal scan type of FIG. 12(a) is only an example, and the present invention is not limited thereto. For example, the residual signals may be scanned using a diagonal scan type in which the 4×4 size block of FIG. 12(a) has been rotated 180 degrees to the right.

FIG. 12(b) shows an example in which a vertical scan is applied to a 4×4 size block. Residual signals (or transform coefficients) within the 4×4 size block can be scanned in order, such as that of FIG. 12(b).

The vertical scan type of FIG. 12(b) is only an example, and the present invention is not limited thereto. For example, the residual signals may be scanned using a vertical scan type in which the 4×4 size block of FIG. 12(b) has been rotated 180 degrees to the right.

FIG. 12(c) shows an example in which a horizontal scan is applied to a 4×4 size block. Residual signals (or transform coefficients) within the 4×4 size block can be scanned in order, such as that of FIG. 12(c).

The vertical scan type of FIG. 12(c) is only an example, and the present invention is not limited thereto. For example, the residual signals may be scanned using a horizontal scan type in which the 4×4 size block of FIG. 12(c) has been rotated 180 degrees to the right.

Tables 4 and 5 can be obtained by incorporating the examples of FIGS. 10 and 11 into a coding syntax for a Transform Unit (TU) and residual signals.

Table 4 shows a TU coding syntax in accordance with an embodiment of the present invention.

TABLE 4

|  | Descriptor |
|---|---|
| transform_unit( x0L, y0L, x0C, y0C, log2TrafoWidth, log2TrafoHeight, trafoDepth, blkIdx ) <br> { <br>   if( cbf_luma[ x0L ][ y0L ][ trafoDepth ] \|\| cbf_cb[ x0C ][ y0C ][ trafoDepth ] \|\| <br>     cbf_cr[ x0C ][ y0C ][ trafoDepth ] { <br>     if( ( diff_cu_qp_delta_depth > 0 ) && !IsCuQpDeltaCoded ) { <br>       cu_qp_delta <br>       IsCuQpDeltaCoded = 1 <br>     } <br>     log2TrafoSize = ( ( log2TrafoWidth + log2TrafoHeight ) >> 1 ) <br>     if( cbf_luma[ x0L ][ y0L ][ trafoDepth ] ) <br>       residual_coding( x0L, y0L, log2TrafoWidth, log2TrafoHeight, 0 ) <br>     if( log2TrafoSize > 2 ) { <br>       if( cbf_cb[ x0C ][ y0C ][ trafoDepth ] ) <br>         residual_coding( x0C, y0C, log2TrafoWidth − 1, log2TrafoHeight − 1, 1 ) <br>       if( cbf_cr[ x0C ][ y0C ][ trafoDepth ] ) <br>         residual_coding( x0C, y0C, log2TrafoWidth − 1, log2TrafoHeight − 1, 2 ) <br>     } else if( blkIdx = = 3 ) { <br>       if( cbf_cb[ x0C ][ y0C ][ trafoDepth ] ) <br>         residual_coding( x0C, y0C, log2TrafoWidth, log2TrafoHeight, 1 ) <br>       if( cbf_cr[ x0C ][ y0C ][ trafoDepth ] ) <br>         residual_coding( x0C, y0C, log2TrafoWidth, log2TrafoHeight, 2 ) <br>     } <br>   } <br> } |  ae(v) |

Referring to Table 4, transform_unit indicates a bit stream for the coefficients of one TU block. Here, whether or not to parse coding information (i.e., residual coding) about residual signals for the TU block is determined based on information (cbf_luma) indicating whether or not the residual signals are present in a luma signal and information (cbf_cb, cbf_cr) indicating whether or not the residual signals are present in a chroma signal.

Table 5 shows a residual signal coding syntax in accordance with an embodiment of the present invention.

TABLE 5

|  | Descriptor |
|---|---|
| residual_coding( x0, y0, log2TrafoWidth, log2TrafoHeight, cIdx ) { <br>   if( log2TrafoWidth = = 1 \|\| log2TrafoHeight = = 1 ) { <br>     log2TrafoWidth = 2 <br>     log2TrafoHeight = 2 <br>   } <br>   If( transform_skip_enabled_flag && !cu_transquant_bypass_flag && <br>     (PredMode = = MODE_INTRA) && <br>     ( log2TrafoWidth = = 2) && (log2TrafoHeight = = 2) ) <br>     transform_skip_flag[ x0 ][ y0 ][ cIdx ] <br>   if( PredMode = = MODE_INTRA && ! <br> transform_skip_flag[ x0 ][ y0 ][ cIdx ] ) { <br>     if( cIdx = = 0 ) <br>       scanIdx = ScanType[ log2TrafoSize − 2 ][ IntraPredMode ] <br>     else <br>       scanIdx = ScanType[ log2TrafoSize − 2 ][ IntraPredModeC ] <br>   } else <br>     scanIdx = 0 <br> ... | ae(v) |

Referring to Table 5, residual_coding means a bit stream for the coefficients of one TU block. Here, the one TU block can be a luma signal or a chroma signal.

log 2TrafoWidth refers to the width of a current block, and log 2TrafoHeight refers to the height of the current block. log 2TrafoSize refers to a value obtained by right shifting and performing operations for the sum of received log 2TrafoWidth and log 2TrafoHeight and means a TU block size for a luma signal.

PredMode refers to a coding mode for a current block. PredMode is intra in the case of intra-frame coding and is inter in the case of inter-frame coding.

scanIdx can be an index indicating a scan type for the luma signal of a current TU block. For example, when a value of scanIdx is 0, it can indicate an up-right scan. When a value of scanIdx is 1, it can indicate a horizontal scan. When a value of scanIdx is 2, it can indicate a vertical scan.

ScanType can be a table indicating a scan type that is determined by an intra-prediction mode of Table 2 and the size of a current block. Here, "ScanType=DIAG" or "Up-right" is one example.

IntraPredMode refers to an intra-prediction mode for a luma signal, and IntraPredModeC refers to an intra-prediction mode for a chroma signal.

In the embodiments of FIGS. 10 and 11, a method of unifying a scan type for all transform skip blocks has been described. In other words, the same scan type has been applied to transform skip blocks. In the following embodiment of the present invention, in the case of a transform skip block, a method of setting a scan type again is described.

Figure 13:
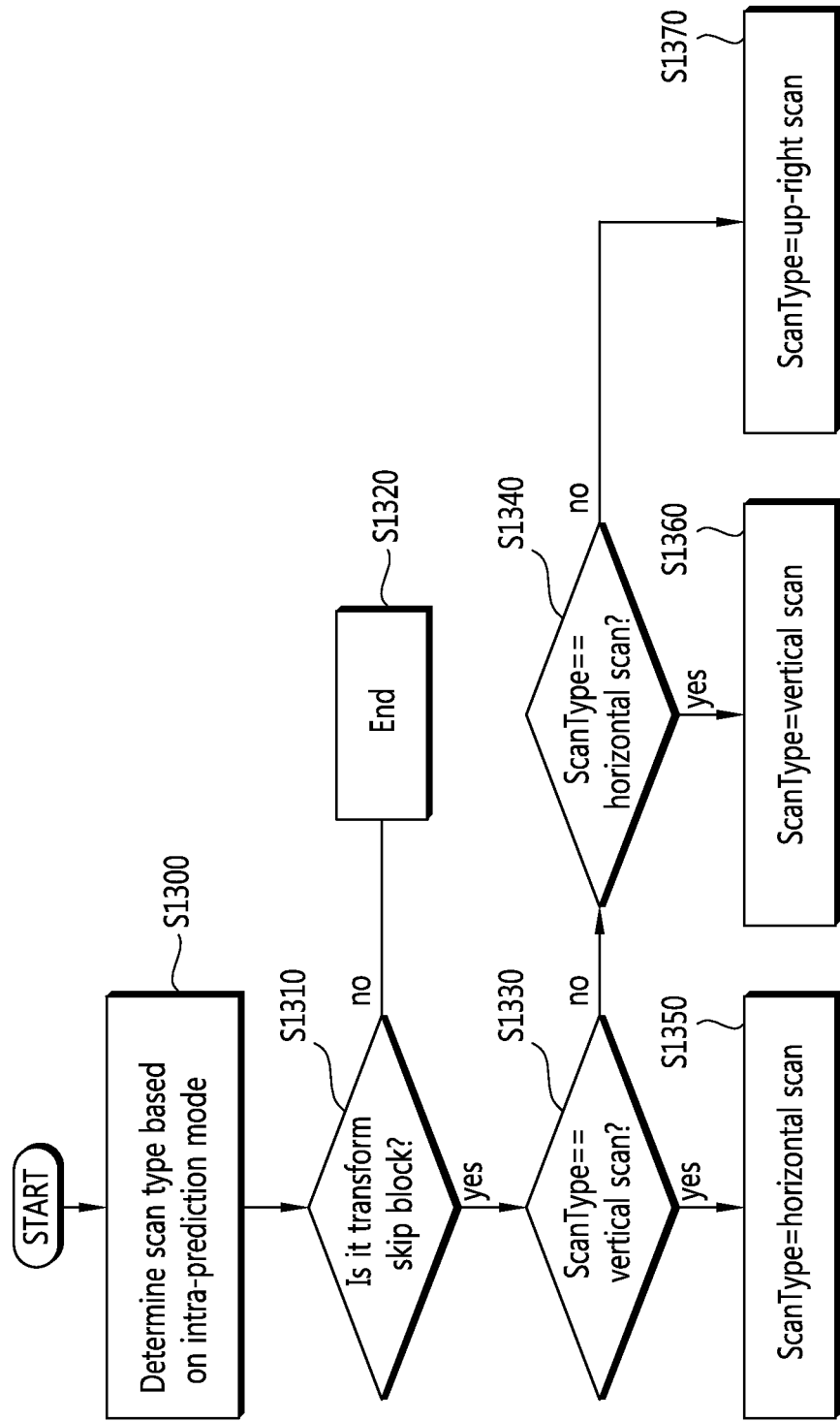
FIG. 13 is a flowchart illustrating a method of deriving a scan type for residual signals (or transform coefficients) in accordance with an embodiment of the present invention.

[Embodiment 2] Method and Apparatus for Deriving a Scan Type for a Transform Skip Block FIG. 13 is a flowchart illustrating a method of deriving a scan type for residual signals (or transform coefficients) in accordance with an embodiment of the present invention.

The method of FIG. 1 can be performed in the encoding apparatus of FIG. 1 or the decoding apparatus of FIG. 2. Although the method of FIG. 13 is illustrated as being performed in the encoding apparatus in the embodiment of FIG. 13 for convenience of description, the method of FIG. 13 can also be equally applied to the decoding apparatus.

Referring to FIG. 13, the encoding apparatus determines a scan type for the residual signals of a current block based on an intra-prediction mode of the current block at step S1300.

For example, any one of up-right, horizontal, and vertical scans can be derived as a scan type for the residual signals of the current block based on an intra-prediction mode of the current block. In this case, for example, the method of FIG. 8 can be used.

If the residual signals (or transform coefficients) of the current block is a transform skip block at step S1310, the encoding apparatus sets a scan type for the residual signals of the current block again at steps S1330 to S1370. If the residual signals (or transform coefficients) of the current block is not a transform skip block at step S1310, the process of deriving a scan type shown in FIG. 13 is terminated at step S1320. Here, a scan type determined at step S1300 is used as the scan type for the residual signals of the current block.

If the residual signals of the current block correspond to a transform skip block and the scan type determined based on an intra-prediction mode of the current block is a vertical scan at step S1330, the encoding apparatus sets a scan type for the residual signals of the current block as a horizontal direction again at step S1350.

If the residual signals of the current block correspond to a transform skip block and the scan type determined based on an intra-prediction mode of the current block is a horizontal scan at step S1340, the encoding apparatus sets a scan type for the residual signals of the current block as a vertical scan again at step S1360.

If the residual signals of the current block correspond to a transform skip block and the scan type determined based on an intra-prediction mode of the current block is not any one of vertical and horizontal scans at step S1340, the encoding apparatus sets a scan type for the residual signals of the current block as an up-right scan again at step S1370.

The method of setting a scan type again depending on whether or not the residual signals of a current block correspond to a transform skip block in the embodiment of FIG. 13 can be applied in various ways. For example, the scan type of a luma signal which is derived using the embodiment of FIG. 13 can be equally applied to a chroma signal. That is, the scan type of the luma signal becomes the same as that of the chroma signal. In contrast, the embodiment of FIG. 13 can be applied to each of a luma signal and a chroma signal. In another embodiment, a scan type for a current block may be determined based on a scan type for neighboring blocks. In yet another embodiment, in the case of a transform skip block, another scan type other than the existing scan types (e.g., vertical, horizontal, and up-right) may be used.

Figure 14:
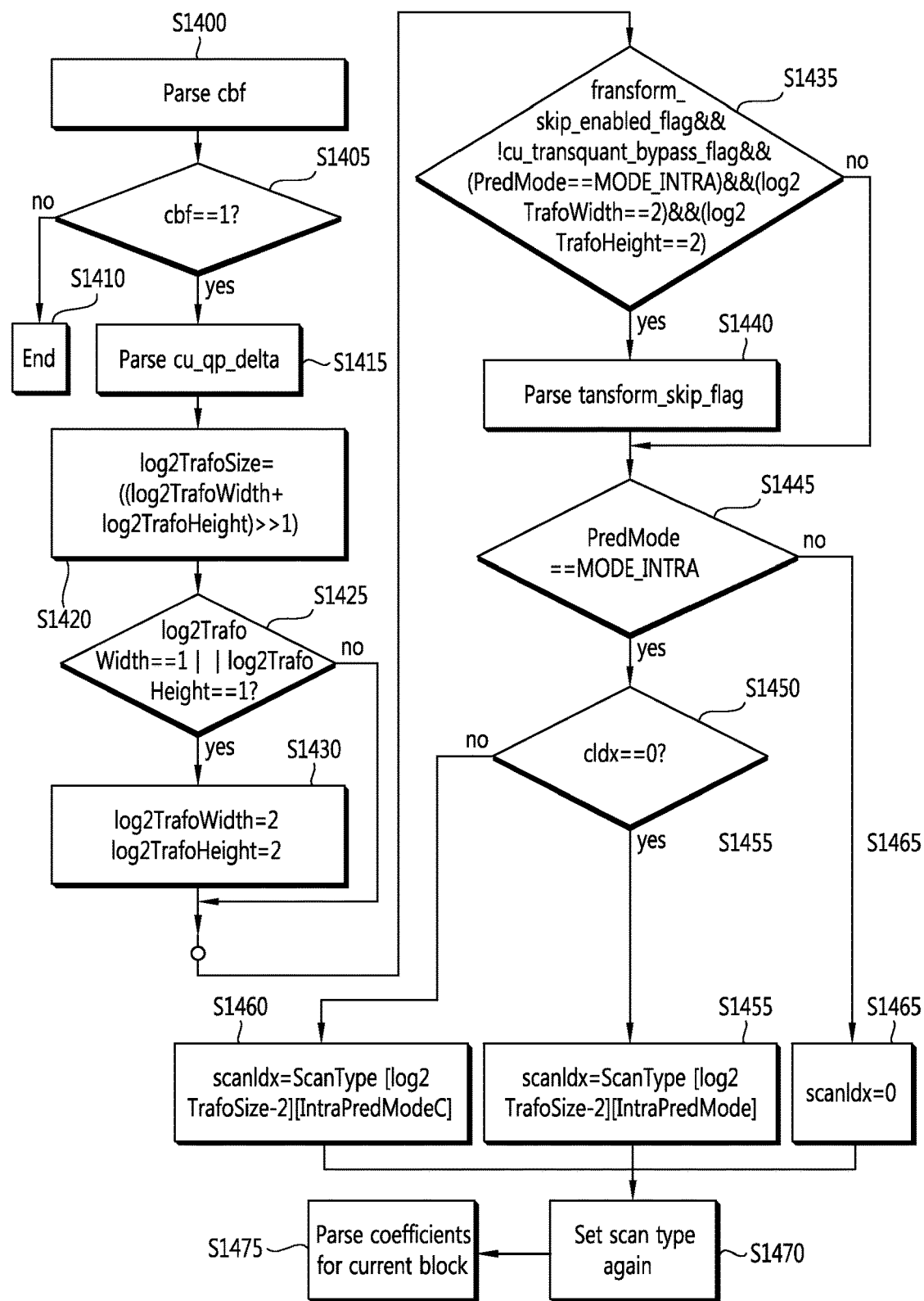
FIG. 14 is a flowchart illustrating a method of deriving a scan type for residual signals (or transform coefficients) in accordance with another embodiment of the present invention.

FIG. 14 is a flowchart illustrating a method of deriving a scan type for residual signals (or transform coefficients) in accordance with another embodiment of the present invention.

The method of FIG. 14 can be performed in the encoding apparatus of FIG. 1 or the decoding apparatus of FIG. 2. Although the method of FIG. 14 is illustrated as being performed in the encoding apparatus in the embodiment of FIG. 14 for convenience of description, the method of FIG. 14 can also be equally applied to the decoding apparatus.

Referring to FIG. 14, the encoding apparatus parses information indicating whether or not residual signals (or transform coefficients) are present in a current block at step S1400.

For example, the information indicating whether or not residual signals are present in a current block can be 'cbf'. If residual signals are present in the current block, that is, if one or more transform coefficients other than 0 are included in the current block, a value of 'cbf' can be 1. If a residual signal is not present in the current block, a value of 'cbf' can be 0.

If the information indicating whether or not residual signals are present in the current block indicates that the residual signals are present in the current block, for example, when a value of cbf is 1 at step S1405, a next process is performed. If the information indicating whether or not residual signals are present in the current block indicates that a residual signal is not present in the current block, for example, when a value of cbf is 0 at step S1405, a next process for the current block is terminated at step S1410.

If the information indicating whether or not residual signals are present in the current block indicates that the residual signals are present in the current block, for example, when a value of cbf is 1, the encoding apparatus parses information indicative of a residual value in a step of quantizing the current block at step S1415. For example, information indicating the residual value in the step of quantizing the current block can be a parameter 'cu_qp_delta'.

The information (i.e., cu_qp_delta) indicating the residual value in the step of quantizing the current block is not related to the deriving of a scan type for the residual signals of the current block. Accordingly, step S1415 may be omitted, and next step S1420 may be performed.

The encoding apparatus sets information about the size of the current block at step S1420.

For example, the information about the size of the current block can be set using a parameter 'log 2TrafoSize'. The parameter 'log 2TrafoSize' can be a value obtained by right shifting and performing operation for the sum of 'log 2TrafoWidth' indicative of the width of the current block and 'log 2TrafoHeight' indicative of the height of the current block. Here, the parameter 'log 2TrafoSize' means the size of a TU block for a luma signal.

If any one of log 2TrafoWidth and log 2TrafoHeight indicating the size of the current block is 1 (i.e., the width and height of the current block have a size of 2) at step S1425, the encoding apparatus sets both log 2TrafoWidth and log 2TrafoHeight of the current block to 2 at step S1430. That is, the width and height of the current block are set to a size of 4.

If a transform skip algorithm has been generally applied to a current picture including the current block (i.e., transform_skip_enabled_flag==1), a mode is not a mode in which transform and quantization are not performed (i.e., !cu_tranquant_bypass_flag), the coding mode of the current block has been coded in an intra-prediction mode (i.e., PredMode=MODE_INTRA), and both log 2TrafoWidth and log 2TrafoHeight of the current block are 2 at step S1435, the encoding apparatus parses information indicating whether or not to apply transform to the current block, for example, transform_skip_flag at step S1440.

If the coding mode of the current block has been coded in an intra-prediction mode (i.e., PredMode==MODE_INTRA) at step S1445, the encoding apparatus can determine a scan type for the residual signals of the current block based on an intra-prediction mode of the current block as described above with reference to FIG. 8 at steps S1450 to S1460.

For example, if a value of cIdx, that is, an indicator indicating the color component of the current block, is 0 at step S1450, that is, if the current block is a luma signal, the encoding apparatus can determine a scan type for the residual signals of the current block based on IntraPredMode for the luma signal of the current block at step S1455. If a value of cIdx of the current block is not 0 at step S1450, that is, if the current block is a chroma signal, the encoding apparatus can determine a scan type for the residual signals of the current block based on IntraPredModeC for the chroma signal of the current block at step S1460.

Here, scanIdx can be an index value indicating a scan type for the residual signals of the current block. For example, if a value of scanIdx is 0, it can indicate an up-right scan. If a value of scanIdx is 1, it can indicate a horizontal scan. If a value of scanIdx is 2, it can indicate a vertical scan. ScanType can be a table indicating a scan type determined by an intra-prediction mode of Table 2 and the size of the current block. IntraPredMode refers to an intra-prediction mode for a luma signal, and IntraPredModeC refers to an intra-prediction mode for a chroma signal.

If the coding mode of the current block has not been coded in an intra-prediction mode at step S1445, the encoding apparatus determines any one of up-right, horizontal, and vertical scans as a scan type for the residual signals of the current block at step S1465. For example, a value of scanIdx can be set to 0, and an up-right can be determined as a scan type for the residual signals of the current block.

The encoding apparatus sets the determined scan type again depending on whether or not the current block is a transform skip block at step S1470.

For example, the determined scan type can be set again using the method of FIG. 13. If the current block is a transform skip block (i.e., the parsed transform_skip_flag is 1), the encoding apparatus can set a horizontal scan as a scan type again if the determined scan type is a vertical scan and set a vertical scan as a scan type again if the determined scan type is a horizontal scan.

The encoding apparatus parses the coefficients of the current block using the scan type set again at step S1475.

Tables 6 and 7 can be obtained by incorporating the examples of FIGS. 13 and 14 into a coding syntax for a Transform Unit (TU) and residual signals.

Table 6 shows a TU coding syntax in accordance with an embodiment of the present invention.

TABLE 6

| | Descriptor |
|---|---|
| transform_unit( x0L, y0L, x0C, y0C, log2TrafoWidth, log2TrafoHeight, trafoDepth, blkIdx ) { | |
|   if( cbf_luma[ x0L ][ y0L ][ trafoDepth ] \|\| cbf_cb[ x0C ][ y0C ][ trafoDepth ] \|\| | |
|     cbf_cr[ x0C ][ y0C ][ trafoDepth ] { | |
|     if( ( diff_cu_qp_delta_depth > 0 ) && !IsCuQpDeltaCoded ) { | |
|       cu_qp_delta | ae(v) |
|       IsCuQpDeltaCoded = 1 | |
|     } | |
|     log2TrafoSize = ( ( log2TrafoWidth + log2TrafoHeight ) >> 1 ) | |
|     if( PredMode = = MODE_INTRA ) { | |
|       scanIdx = ScanType[ log2TrafoSize − 2 ][ IntraPredMode ] | |
|       scanIdxC = ScanType[ log2TrafoSize − 2 ][ IntraPredModeC ] | |
|     } else { | |
|       scanIdx = 0 | |
|       scanIdxC = 0 | |
|     } | |
|     if( cbf_luma[ x0L ][ y0L ][ trafoDepth ] ) | |
|       residual_coding( x0L, y0L, log2TrafoWidth, log2TrafoHeight, scanIdx, 0 ) | |
|     if( log2TrafoSize > 2 ) { | |
|       if( cbf_cb[ x0C ][ y0C ][ trafoDepth ] ) | |
|         residual_coding( x0C, y0C, log2TrafoWidth − 1, log2TrafoHeight − 1, scanIdxC, 1 ) | |
|       if( cbf_cr[ x0C ][ y0C ][ trafoDepth ] ) | |

TABLE 6-continued

| Descriptor |
|---|

```
        residual_coding( x0C, y0C, log2TrafoWidth − 1, log2TrafoHeight − 1, scanIdxC, 2 )
    } else if( blkIdx = = 3 ) {
        if( cbf_cb[ x0C ][ y0C ][ trafoDepth ] )
            residual_coding( x0C, y0C, log2TrafoWidth, log2TrafoHeight, scanIdxC, 1 )
        if( cbf_cr[ x0C ][ y0C ][ trafoDepth ] )
            residual_coding( x0C, y0C, log2TrafoWidth, log2TrafoHeight, scanIdxC, 2 )
        }
    }
}
```

Referring to Table 6, transform_unit indicates a bit stream for the coefficients of one TU block. Here, whether or not to parse coding information (residual coding) about residual signals for the TU block is determined based on information (cbf_luma) indicating whether or not the residual signals are present in a luma signal and information (cbf_cb, cbf_cr) indicating whether or not the residual signals are present in a chroma signal.

Table 7 shows a residual signal coding syntax in accordance with an embodiment of the present invention.

TABLE 7

| | Descriptor |
|---|---|
| residual_coding( x0, y0, log2TrafoWidth, log2TrafoHeight, scanIdx, cIdx ) { | |
|   if( log2TrafoWidth = = 1 \|\| log2TrafoHeight = = 1 ) { | |
|     log2TrafoWidth = 2 | |
|     log2TrafoHeight = 2 | |
|   } | |
|   If( transform_skip_enabled_flag && !cu_transquant_bypass_flag && | |
|     (PredMode = = MODE_INTRA) && | |
|     ( log2TrafoWidth = = 2) && (log2TrafoHeight = = 2) ) | |
|     transform_skip_flag[ x0 ][ y0 ][ cIdx ] | ae(v) |
|   if( transform_skip_flag[ x0 ][ y0 ][ cIdx ] ) { | |
|     scanIdx = (scanIdx = = 1) ? 2 : (scanIdx = = 2) ? 1 : 0 | |
| ... | |

Referring to Table 7, residual_coding means a bit stream for the coefficients of one TU block. Here, the one TU block can be a luma signal or a chroma signal.

log 2TrafoWidth refers to the width of a current block, and log 2TrafoHeight refers to the height of the current block. log 2TrafoSize means a result obtained by right shifting and performing operations for the sum of received log 2TrafoWidth and log 2TrafoHeight and refers to the size of a TU block for a luma signal.

PredMode refers to a coding mode for the current block. PredMode is intra in the case of intra-frame coding and is inter in the case of inter-frame coding.

scanIdx can be an index indicative of a scan type for the luma signal of a current TU block. For example, if a value of scanIdx is 0, it can indicate an up-right scan. If a value of scanIdx is 1, it can indicate a horizontal scan. If a value of scanIdx is 2, it can indicate a vertical scan.

ScanType can be a table indicating a scan type that is determined by an intra-prediction mode of Table 2 and the size of a current block. Here, "ScanType=DIAG" or "Up-right" is only one example.

IntraPredMode refers to an intra-prediction mode for a luma signal, and IntraPredModeC refers to an intra-prediction mode for a chroma signal.

Meanwhile, the above-described embodiments can have different ranges of application depending on the size of a block, the depth of a CU, or the depth of a TU. A parameter (e.g., information about the size or depth of a block) that determines the range of application may be set by an encoder and a decoder so that the parameter has a predetermined value or may be set to have a predetermined value according to a profile or level. When an encoder writes a parameter value into a bit stream, a decoder may obtain the value from the bit stream and use the value.

If the range of application is different depending on the depth of a CU, the following three methods can be applied to the above-described embodiments as illustrated in Table 8. The method A is applied to only a depth having a specific depth or higher, the method B is applied to only a depth having a specific depth or lower, and the method C is applied to only a specific depth.

Table 8 shows an example of methods of determining a range in which the methods of the present invention are applied depending on the depth of a CU (or TU). In Table 8, 'O' means that a corresponding method is applied to a corresponding depth of a CU (or TU), and 'X' means that a corresponding method is not applied to a corresponding depth of a CU (or TU).

TABLE 8

| Depth of CU (or TU) indicating range of application | Method A | Method B | Method C |
|---|---|---|---|
| 0 | X | O | X |
| 1 | X | O | X |
| 2 | O | O | O |
| 3 | O | X | X |
| 4 | O | X | X |

Referring to Table 8, if the depth of a CU (or TU) is 2, all the method A, the method B, and the method C can be applied to the embodiments of the present invention.

If the embodiments of the present invention are not applied to all the depths of a CU (or TU), it may be indicated using a specific indicator (e.g., flag) or may be represented by signaling a value that is 1 greater than a maximum value of the depth of a CU as a value of the depth of a CU indicating a range of application.

Furthermore, a method of determining a range in which the methods of the present invention are applied depending on the depth of a CU (or TU) can be applied to each of the embodiment 1 (FIGS. 10 and 11) of the present invention and the embodiment 2 (FIGS. 13 and 14) of the present invention or a combination of the embodiments 1 and 2.

Furthermore, a method of determining a range in which the methods of the present invention are applied depending on the depth of a CU (or TU) can be applied to a case where a luma signal and a chroma signal have different resolutions. A method of determining a range in which a frequency transform method (or scan type) is applied when a luma signal and a chroma signal have different resolution is described below with reference to FIGS. 15 and 16.

Figure 15:
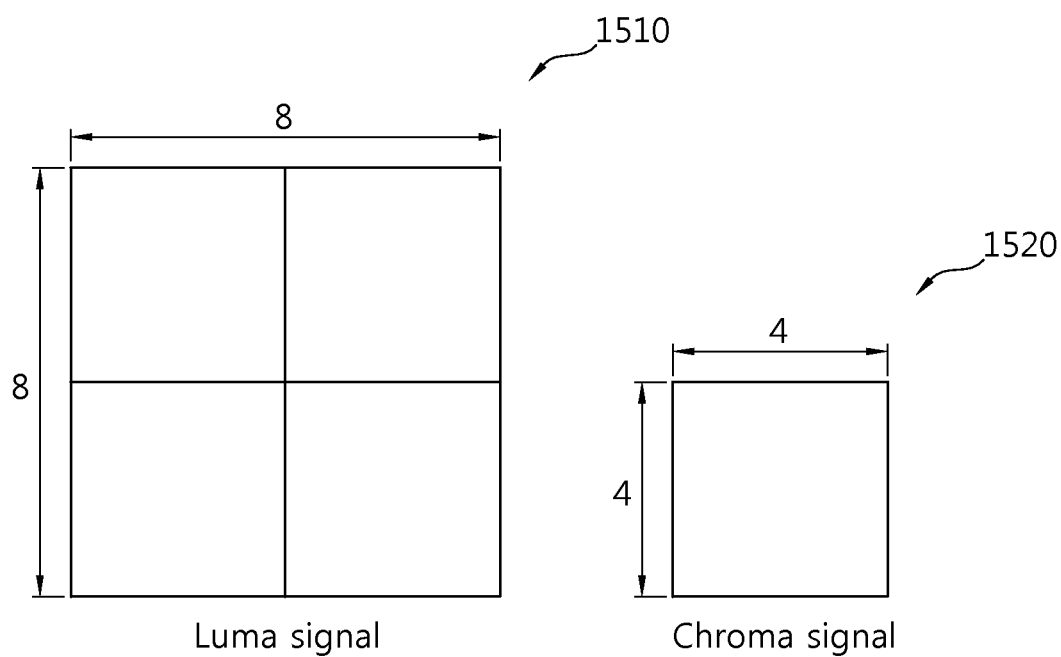
FIG. 15 is a diagram showing an example of a difference in the resolution between a luma block and a chroma block.

FIG. 15 is a diagram showing an example of a difference in the resolution between a luma block and a chroma block.

Referring to FIG. 15, assuming that a chroma signal has a ¼ size of a luma signal (e.g., the luma signal has a 416×240 size and a chroma signal has a 208×120 size), a luma block 1510 having an 8×8 size corresponds to a chroma block 1520 having a 4×4 size.

In this case, the 8×8 size luma block 1510 can include four luma blocks each having a 4×4 size and can have intra-prediction modes in the respective 4×4 size luma blocks. In contrast, the 4×4 size chroma block 1520 may not be partitioned into 2×2 size chroma blocks. The 4×4 size chroma block 1520 can have one intra-prediction mode.

Here, if the 4×4 size chroma block 1520 has been coded in an LM mode 'Intra_FromLuma' or the 4×4 size chroma block 1520 has been coded in an DM mode (i.e., mode in which an intra-prediction mode of a luma signal is used as an intra-prediction mode of a chroma signal without change), any one of intra-prediction modes of the four 4×4 size luma blocks can be used as an intra-prediction mode of the 8×8 size luma block 1510 for deriving a frequency transform method (or scan type) for the residual signals of the 4×4 size chroma block 1520.

In order to selectively apply a frequency transform method (or scan type) to the residual signals of a chroma signal, one of the following methods 1 to 4 can be used as a method of driving an intra-prediction mode in various ways.

1. An intra-prediction mode of a block placed at the left top of a luma signal block can be used.
2. An intra-prediction mode of a block placed at the left top, left bottom, or right bottom of a luma signal block can be used.
3. An average value or middle value of the four luma signal blocks can be used.
4. An average value or middle value using intra-prediction modes of the four luma signal blocks of a current block and chroma signal blocks of blocks neighboring a current block can be used.

In addition to the 1 to 4 methods, an intra-prediction mode for a chroma signal can be derived in various ways.

Figure 16:
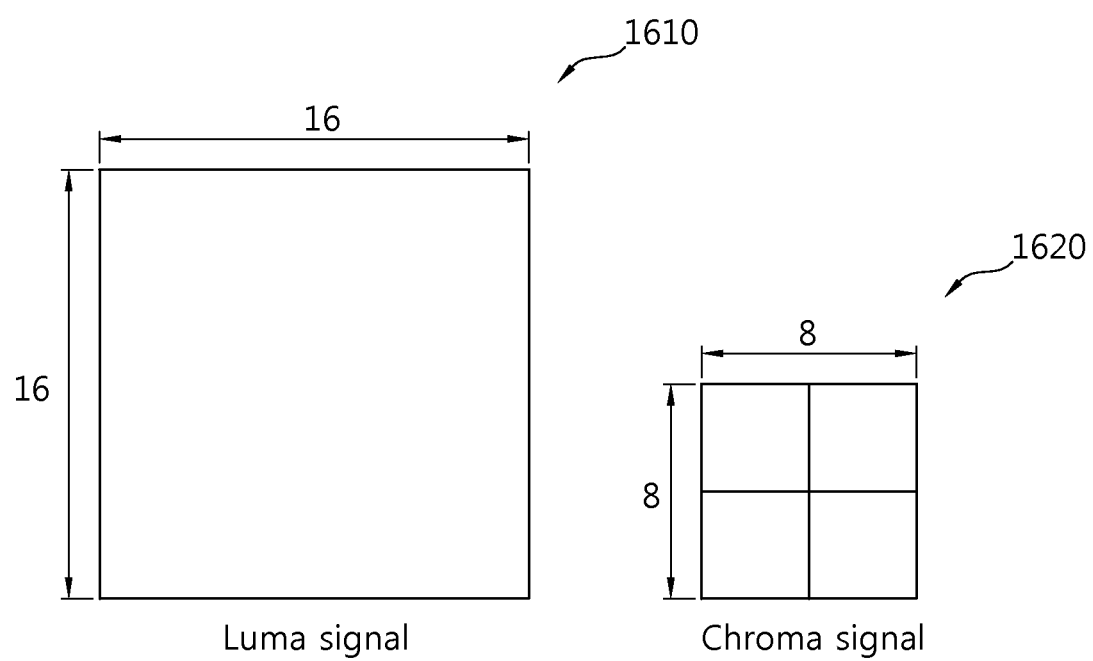
FIG. 16 is a diagram showing another example of a difference in the resolution between a luma block and a chroma block.

FIG. 16 is a diagram showing another example of a difference in the resolution between a luma block and a chroma block.

Referring to FIG. 16, a luma block 1610 having a 16×16 size can have one intra-prediction mode. In contrast, a chroma block 1620 having an 8×8 size can be partitioned into four chroma blocks each having a 4×4 size. Each of the 4×4 size chroma blocks can have an intra-prediction mode.

If the 8×8 size chroma block 1620 has been coded in an LM mode 'Intra_FromLuma' or the 8×8 size chroma block 1620 has been coded in a DM mode (i.e., mode in which an intra-prediction mode of a luma signal is used as an intra-prediction mode of a chroma signal without change), an intra-prediction mode of the 16×16 size luma block 1610 can be used to derive a frequency transform method (or scan type) for the residual signals of the 8×8 size chroma block 1620. In another embodiment, an intra-prediction mode can be derived from blocks (i.e., luma blocks or chroma blocks) neighboring a current block in order to derive a frequency transform method (or scan type) for the residual signals of the 8×8 size chroma block 1620.

The frequency transform method or the scan type can be differently applied to a chroma block depending on the size of a luma block or to a luma signal image and a chroma signal image or may be differently applied depending on a horizontal scan and a vertical scan.

Table 9 is an example schematically showing a combination of methods for determining a range of application depending on a block size, a chroma signal and a luma signal, and vertical and horizontal scans.

TABLE 9

| LUMA BLOCK SIZE | CHROMA BLOCK SIZE | LUMA APPLIED | CHROMA APPLIED | HOR. APPLIED | VER. APPLIED | METHODS |
|---|---|---|---|---|---|---|
| 4(4 × 4, 4 × 2, 2 × 4) | 2(2 × 2) | ○ or X | ○ or X | ○ or X | ○ or X | A 1, 2, ... |
| | 4(4 × 4, 4 × 2, 2 × 4) | ○ or X | ○ or X | ○ or X | ○ or X | B 1, 2, ... |
| | 8(8 × 8, 8 × 4, 4 × 8, 2 × 8, etc.) | ○ or X | ○ or X | ○ or X | ○ or X | C 1, 2, ... |
| | 16(16 × 16, 16 × 8, 4 × 16, 2 × 16, etc.) | ○ or X | ○ or X | ○ or X | ○ or X | D 1, 2, ... |
| | 32(32 × 32) | ○ or X | ○ or X | ○ or X | ○ or X | E 1, 2, ... |
| 8(8 × 8, 8 × 4, 2 × 8, etc.) | 2(2 × 2) | ○ or X | ○ or X | ○ or X | ○ or X | F 1, 2, ... |
| | 4(4 × 4, 4 × 2, 2 × 4) | ○ or X | ○ or X | ○ or X | ○ or X | G 1, 2, ... |
| | 8(8 × 8, 8 × 4, 4 × 8, 2 × 8, etc.) | ○ or X | ○ or X | ○ or X | ○ or X | H 1, 2, ... |
| | 16(16 × 16, 16 × 8, 4 × 16, 2 × 16, etc.) | ○ or X | ○ or X | ○ or X | ○ or X | I 1, 2, ... |
| | 32(32 × 32) | ○ or X | ○ or X | ○ or X | ○ or X | J 1, 2, ... |

TABLE 9-continued

| LUMA BLOCK SIZE | CHROMA BLOCK SIZE | LUMA APPLIED | CHROMA APPLIED | HOR. APPLIED | VER. APPLIED | METHODS |
|---|---|---|---|---|---|---|
| 16(16 × 16, 8 × 16, 4 × 16, etc.) | 2(2 × 2) | ○ or X | ○ or X | ○ or X | ○ or X | K 1, 2, ... |
| | 4(4 × 4, 4 × 2, 2 × 4) | ○ or X | ○ or X | ○ or X | ○ or X | L 1, 2, ... |
| | 8(8 × 8, 8 × 4, 4 × 8, 2 × 8, etc.) | ○ or X | ○ or X | ○ or X | ○ or X | M 1, 2, ... |
| | 16(16 × 16, 16 × 8, 4 × 16, 2 × 16, etc.) | ○ or X | ○ or X | ○ or X | ○ or X | N 1, 2, ... |
| | 32(32 × 32) | ○ or X | ○ or X | ○ or X | ○ or X | O 1, 2, ... |

In the case of the method 'G 1' of the methods listed in Table 9, if the size of the luma block is 8(8×8, 8×4, 2×8, etc.) and the size of the chroma block is 4(4×4, 4×2, 2×4), the embodiment 1 (FIGS. 10 and 11) of the present invention or the embodiment 2 (FIGS. 13 and 14) of the present invention can be applied to a luma signal, a chroma signal, a horizontal signal, and a vertical signal.

In the case of the method 'M 1' of the methods listed in Table 9, if the size of the luma block is 16(16×16, 8×16, 2×16, etc.) and the size of the chroma block is 4(4×4, 4×2, 2×4), the embodiment 1 (FIGS. 10 and 11) of the present invention or the embodiment 2 (FIGS. 13 and 14) of the present invention can be applied to a luma signal, a chroma signal, and a horizontal signal, but may not be applied to a vertical signal.

Figure 17:
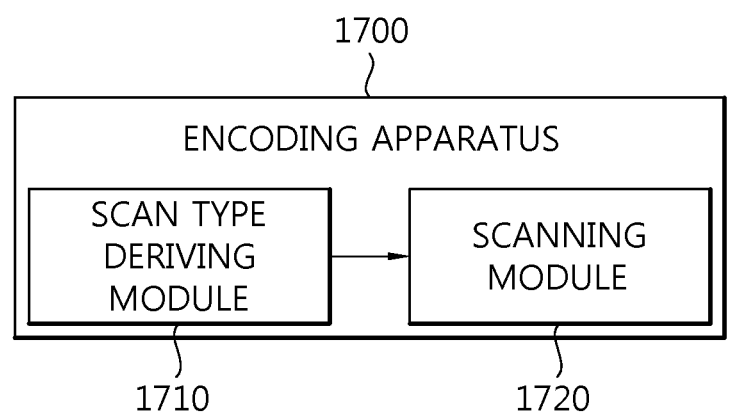
FIG. 17 is a schematic block diagram of an encoding apparatus in accordance with an embodiment of the present invention.

FIG. 17 is a schematic block diagram of an encoding apparatus in accordance with an embodiment of the present invention.

Referring to FIG. 17, the encoding apparatus 1700 includes a scan type deriving module 1710 and a scanning module 1720.

The scan type deriving module 1710 derives a scan type for the residual signals of a current block depending on whether or not the current block is a transform skip block.

Here, the transform skip block is a block in which transform has not been applied to a current block and can be specified by information, for example, transform_skip_flag indicating whether or not to apply transform to the current block.

A detailed method of deriving a scan type for the residual signals of a current block depending on whether or not the current block is a transform skip block has been described in detail in connection with the embodiments of this specification.

The scanning module 1720 applies the scan type, derived by the scan type deriving module 1710, to the residual signals of the current block. For example, the residual signals of the current block can be scanned as in the scan type shown in FIG. 12.

Figure 18:
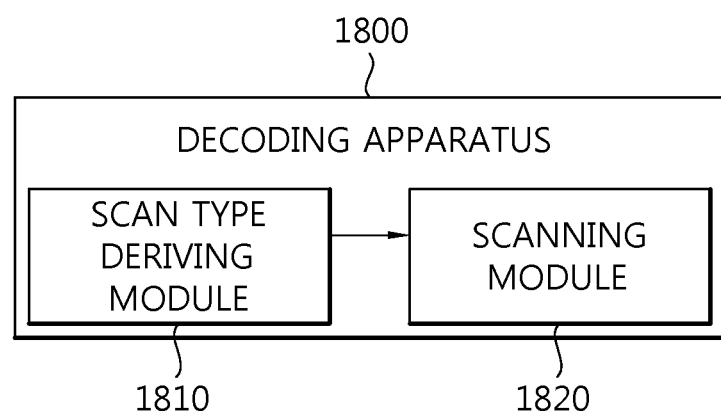
FIG. 18 is a schematic block diagram of a decoding apparatus in accordance with an embodiment of the present invention.

FIG. 18 is a schematic block diagram of a decoding apparatus in accordance with an embodiment of the present invention.

Referring to FIG. 18, the decoding apparatus 1800 includes a scan type deriving module 1810 and a scanning module 1820.

The scan type deriving module 1810 derives a scan type for the residual signals of a current block depending on whether or not the current block is a transform skip block.

Here, the transform skip block is a block in which transform has not been applied to a current block and can be specified by information, for example, transform_skip_flag indicating whether or not to apply transform to the current block.

A detailed method of deriving a scan type for the residual signals of a current block depending on whether or not the current block is a transform skip block has been described in detail in connection with the embodiments of this specification.

The scanning module 1820 applies the scan type, derived by the scan type deriving module 1810, to the residual signals of the current block. For example, the residual signals of the current block can be scanned as in the scan type shown in FIG. 12.

In the above-described embodiments, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The above description is only an example of the technical spirit of the present invention, and those skilled in the art may change and modify the present invention in various ways without departing from the intrinsic characteristic of the present invention. Accordingly, the disclosed embodiments should not be construed as limiting the technical spirit of the present invention, but should be construed as illustrating the technical spirit of the present invention. The scope of the technical spirit of the present invention is not restricted by the embodiments, and the scope of the present invention should be interpreted based on the appended claims. Accordingly, the present invention should be construed as covering all modifications or variations induced from the meaning and scope of the appended claims and their equivalents.

The invention claimed is:

1. A video decoding method, comprising:
    obtaining first information indicating whether a residual signal is present in a current block;
    determining a transform type of the current block, based on second information indicating whether or not an inverse-transform based on discrete cosine transform (DCT) or discrete sine transform (DST) is allowed;
    acquiring transform coefficients from the residual signal of the current block based on a scanning direction for the residual signal of the current block, if the first information indicates that the residual signal is present in the current block;

performing the inverse-transform on the transform coefficients based on the determined transform type to obtain residual samples;

deriving an intra prediction mode of the current block;

obtaining prediction samples of the current block based on the intra prediction mode of the current block; and reconstructing the current block by adding the residual samples and the prediction samples, wherein the scanning direction is determined based on the second information.

2. The video decoding method of claim 1, wherein the scanning direction is determined based on the intra prediction mode of the current block, if the second information indicates that the inverse-transform based on DCT or DST is allowed.

3. The video decoding method of claim 2, wherein the scanning direction is determined independently to the intra prediction mode of the current block, if the second information indicates that the inverse-transform based on DCT or DST is not allowed.

4. The video decoding method of claim 1, wherein the scanning direction is determined to be one of a first direction, a second direction and a third direction, based on the intra prediction mode of the current block, if the second information indicates that the inverse-transform based on DCT or DST is allowed.

5. The video decoding method of claim 4, wherein the second direction is a direction of columns of the current block, and the third direction is a direction of rows of the current block.

6. The video decoding method of claim 5, wherein the scanning direction is determined to be the first direction, independently to the intra prediction mode of the current block, if the second information indicates that the inverse-transform based on the DCT or the DST is not allowed.

7. The video decoding method of claim 6, wherein the second direction is more vertical than the first direction, and the third direction is more horizontal than the first direction.

8. The video decoding method of claim 1, wherein the transform type of the current block is determined further based on a size of the current block.

9. A video encoding method, comprising:

deriving an intra prediction mode of a current block;

performing an intra prediction based on the intra prediction mode of the current block to generate prediction samples for the current block;

determining whether a residual signal is present in the current block;

generating residual samples by subtracting the prediction samples from the current block;

determining a transform type of the current block, based on whether or not an inverse-transform based on discrete cosine transform (DCT) or discrete sine transform (DST) is allowed;

transforming the residual samples based on the transform type of the current block to generate transform coefficients;

applying a scanning direction to the transform coefficients;

generating a bitstream comprising the residual signal if the residual signal is present in the current block, wherein the scanning direction is determined based on whether or not an inverse-transform based on discrete cosine transform (DCT) or discrete sine transform (DST) is allowed.

10. A non-transitory computer-readable recording medium storing a bitstream which is decoded by a decoding method, the video decoding method comprising:

obtaining first information indicating whether a residual signal is present in a current block;

determining a transform type of the current block, based on second information indicating whether or not an inverse-transform based on discrete cosine transform (DCT) or discrete sine transform (DST) is allowed;

acquiring transform coefficients from the residual signal of the current block based on a scanning direction for the residual signal of the current block, if the first information indicates that the residual signal is present in the current block;

performing the inverse-transform on the transform coefficients based on the determined transform type to obtain residual samples;

deriving an intra prediction mode of the current block;

obtaining prediction samples of the current block based on the intra prediction mode of the current block; and reconstructing the current block by adding the residual samples and the prediction samples, wherein the scanning direction is determined based on the second information.

* * * * *